(12) United States Patent
Drogi et al.

(10) Patent No.: US 12,483,213 B2
(45) Date of Patent: Nov. 25, 2025

(54) SYSTEMS AND METHODS FOR PULSE SHAPING VOLTAGE TRANSITIONS IN ENVELOPE TRACKING SYSTEMS

(71) Applicant: Skyworks Solutions, Inc., Irvine, CA (US)

(72) Inventors: Serge Francois Drogi, Flagstaff, AZ (US); Florinel G. Balteanu, Irvine, CA (US); David Steven Ripley, Cedar Rapids, IA (US)

(73) Assignee: Skyworks Solutions, Inc., Irvine, CA (US)

( * ) Notice: Subject to any disclaimer, the term of this patent is extended or adjusted under 35 U.S.C. 154(b) by 70 days.

(21) Appl. No.: 18/471,593

(22) Filed: Sep. 21, 2023

(65) Prior Publication Data

US 2024/0113671 A1 Apr. 4, 2024

Related U.S. Application Data

(60) Provisional application No. 63/377,838, filed on Sep. 30, 2022.

(51) Int. Cl.
*H03F 3/24* (2006.01)
*H03F 1/02* (2006.01)
*H04B 1/04* (2006.01)

(52) U.S. Cl.
CPC .......... *H03F 3/245* (2013.01); *H03F 1/0227* (2013.01); *H04B 1/0475* (2013.01); *H03F 2200/102* (2013.01); *H03F 2200/451* (2013.01); *H04B 2001/0408* (2013.01)

(58) Field of Classification Search
CPC .. H03F 3/245; H03F 1/0227; H03F 2200/102; H03F 2200/451; H04B 1/0475; H04B 2001/0408
USPC ....................................................... 375/297
See application file for complete search history.

(56) References Cited

U.S. PATENT DOCUMENTS

| | | |
|---|---|---|
| 6,515,553 B1 | 2/2003 | Filiol et al. |
| 7,136,003 B1 | 11/2006 | Ripley et al. |
| 7,142,053 B2 | 11/2006 | Phillips et al. |
| 8,719,459 B2 | 5/2014 | Ripley |
| 9,083,455 B2 | 7/2015 | Popplewell et al. |
| 10,090,812 B2 | 10/2018 | Modi et al. |
| 10,243,517 B2 | 3/2019 | Lehtola et al. |
| 10,312,867 B2 | 6/2019 | Ripley et al. |

(Continued)

*Primary Examiner* — Kevin M Burd
(74) *Attorney, Agent, or Firm* — Knobbe, Martens, Olson & Bear, LLP

(57) ABSTRACT

Systems and methods for pulse shaping voltage transitions in envelope tracking systems are provided. In one aspect, a radio frequency module includes a power amplifier configured to receive a radio frequency input signal and a voltage source. The power amplifier further configured to amplify a radio frequency input signal using the voltage source to generate an output radio frequency signal. The radio frequency module further includes a multi-level switch modulator configured to receive an envelope signal indicative of an envelope of the radio frequency input signal and generate the voltage source based on the envelope signal at one of a plurality of discrete voltage levels. The multi-level switch modulator is further configured to generate the voltage source using an analog component during transitions between discrete voltage levels and a digital component following the transitions.

22 Claims, 19 Drawing Sheets

(56) References Cited

U.S. PATENT DOCUMENTS

| | | | |
|---|---|---|---|
| 11,152,921 B1* | 10/2021 | Boda | H03K 19/20 |
| 11,431,357 B2 | 8/2022 | Balteanu et al. | |
| 11,626,933 B2 | 4/2023 | Balteanu et al. | |
| 11,658,615 B2 | 5/2023 | Balteanu et al. | |
| 11,689,202 B2 | 6/2023 | Balteanu et al. | |
| 2006/0028271 A1* | 2/2006 | Wilson | H03F 3/245 |
| | | | 330/199 |
| 2013/0231120 A1* | 9/2013 | Koc | H04W 76/34 |
| | | | 455/450 |
| 2015/0061911 A1* | 3/2015 | Pagnanelli | H03M 3/30 |
| | | | 341/144 |
| 2016/0241294 A1 | 8/2016 | Pehlke et al. | |
| 2016/0336901 A1* | 11/2016 | Khesbak | H04W 52/0261 |
| 2018/0241350 A1* | 8/2018 | Leipold | H03F 3/21 |
| 2020/0336110 A1* | 10/2020 | Drogi | H03F 1/0227 |
| 2020/0350878 A1* | 11/2020 | Drogi | H04W 52/52 |
| 2021/0028773 A1 | 1/2021 | Balteanu et al. | |
| 2021/0099135 A1* | 4/2021 | Balteanu | H03F 3/72 |
| 2022/0069775 A1 | 3/2022 | Balteanu et al. | |
| 2022/0085764 A1 | 3/2022 | Drogi et al. | |
| 2022/0085765 A1 | 3/2022 | Drogi et al. | |
| 2024/0201937 A1* | 6/2024 | Oesch | H04R 3/00 |

* cited by examiner

-- Prior Art --

FIG.2 -- Prior Art --

-- Prior Art --

-- Prior Art --

-- Prior Art --

SYSTEMS AND METHODS FOR PULSE SHAPING VOLTAGE TRANSITIONS IN ENVELOPE TRACKING SYSTEMS

CROSS-REFERENCE TO RELATED APPLICATION(S)

This application claims the benefit of U.S. Provisional Application No. 63/377,838, filed Sep. 30, 2022. The foregoing application is hereby incorporated by reference in its entirety. Any and all applications for which a foreign or domestic priority claim is identified in the Application Data Sheet as filed with the present application are hereby incorporated by reference under 37 CFR 1.57.

BACKGROUND

Field

Embodiments of this disclosure relate to radio frequency front end modules that include power amplifiers.

Description of the Related Technology

With 5G development, the available bandwidth for radio frequency (RF) communication may be higher than for previous RF communications standards. However, there are many challenges to allocating the available bandwidth to provide higher transfer speeds while containing the implementation costs and maintaining compatibility with other requirements set by RF communication standards. One particular challenge involves increasing the efficiency of amplifying radio frequency signals.

SUMMARY

The innovations described in the claims each have several aspects, no single one of which is solely responsible for its desirable attributes. Without limiting the scope of the claims, some prominent features of this disclosure will now be briefly described.

One aspect of this disclosure is a radio frequency module comprising: a power amplifier configured to receive a radio frequency input signal and a voltage source, the power amplifier further configured to amplify a radio frequency input signal using the voltage source to generate an output radio frequency signal; and a multi-level switch modulator configured to receive an envelope signal indicative of an envelope of the radio frequency input and generate the voltage source based on the envelope signal at one of a plurality of discrete voltage levels, the multi-level switch modulator is further configured to generate the voltage source using an analog component during transitions between discrete voltage levels and a digital component following the transitions.

In some embodiments, the analog component includes a linear power amplifier and the digital component includes a multi-level switch matrix.

In some embodiments, the multi-level switch modulator further includes a switch configured to electrically connect the linear power amplifier to an output of the multi-level switch modulator during the transitions and disconnect the linear power amplifier from the output following the transitions.

In some embodiments, the multi-level switch matrix includes a plurality of switches configured to connect an output of the multi-level switch matrix to one of the plurality of discrete voltage levels.

In some embodiments, the radio frequency module further comprises a filter electrically coupled between the multi-level switch modulator and the power amplifier, the filter configured is to filter frequencies above a predetermined threshold value.

In some embodiments, the filter is configured as a second order filter and includes an inductor and a capacitor.

In some embodiments, the capacitor includes a variable capacitor configured to adjust the filter to cover multiple octaves of bandwidth adjustment.

In some embodiments, the radio frequency module further comprises a pulse shaping filter configured to control a bandwidth of the envelope signal and provide a pulse shaped envelope signal to the multi-level switch modulator.

In some embodiments, the pulse shaping filter includes a delta encoder configured to generate a pulse train that encodes the envelope signal in the form of delta in the envelope signal.

In some embodiments, the pulse shaping filter includes a programmable digital filter and a delta-sigma modulator, the programmable digital filter is configured to generate a pulse train based on the envelope signal, and the delta-sigma modulator is configured to noise shape the pulse train such that a moving average of the shaped pulse train follows a desired pulse shaped waveform.

Another aspect is a mobile device comprising: an antenna configured to transmit and receive radio frequency signals; and a front end system coupled to the antenna and including: a power amplifier configured to receive a radio frequency input signal and a voltage source, the power amplifier further configured to amplify a radio frequency input signal using the voltage source to generate an output radio frequency signal, and the front end system further including a multi-level switch modulator configured to receive an envelope signal indicative of an envelope of the radio frequency input and generate the voltage source based on the envelope signal at one of a plurality of discrete voltage levels, the multi-level switch modulator is further configured to generate the voltage source using an analog component during transitions between discrete voltage levels and a digital component following the transitions.

In some embodiments, the analog component includes a linear power amplifier and the digital component includes a multi-level switch matrix.

In some embodiments, the multi-level switch modulator further includes a switch configured to electrically connect the linear power amplifier to an output of the multi-level switch modulator during the transitions and disconnect the linear power amplifier from the output following the transitions.

In some embodiments, the multi-level switch matrix includes a plurality of switches configured to connect an output of the multi-level switch matrix to one of the plurality of discrete voltage levels.

In some embodiments, the front end system further includes a filter electrically coupled between the multi-level switch modulator and the power amplifier, the filter configured is to filter frequencies above a predetermined threshold value.

In some embodiments, the filter is configured as a second order filter and includes an inductor and a capacitor.

In some embodiments, the capacitor includes a variable capacitor configured to adjust the filter to cover multiple octaves of bandwidth adjustment.

In some embodiments, the front end system further includes a pulse shaping filter configured to control a bandwidth of the envelope signal and provide a pulse shaped envelope signal to the MLS modulator.

In some embodiments, the pulse shaping filter includes a delta encoder configured to generate a pulse train that encodes the envelope signal in the form of delta in the envelope signal.

In some embodiments, the pulse shaping filter includes a programmable digital filter and a delta-sigma modulator, the programmable digital filter is configured to generate a pulse train based on the envelope signal, and the delta-sigma modulator is configured to noise shape the pulse train such that a moving average of the shaped pulse train follows a desired pulse shaped waveform.

In some embodiments, an envelope tracking circuit comprises a multi-level switch modulator configured to receive an envelope signal indicative of an envelope of a radio frequency input signal and generate a voltage source for supplying a power amplifier. The voltage source is generated based on the envelope signal at one of a plurality of discrete voltage levels, the multi-level switch modulator further configured to generate the voltage source using an analog component during transitions between discrete voltage levels and a digital component following the transitions.

DETAILED DESCRIPTION

Figure 1:
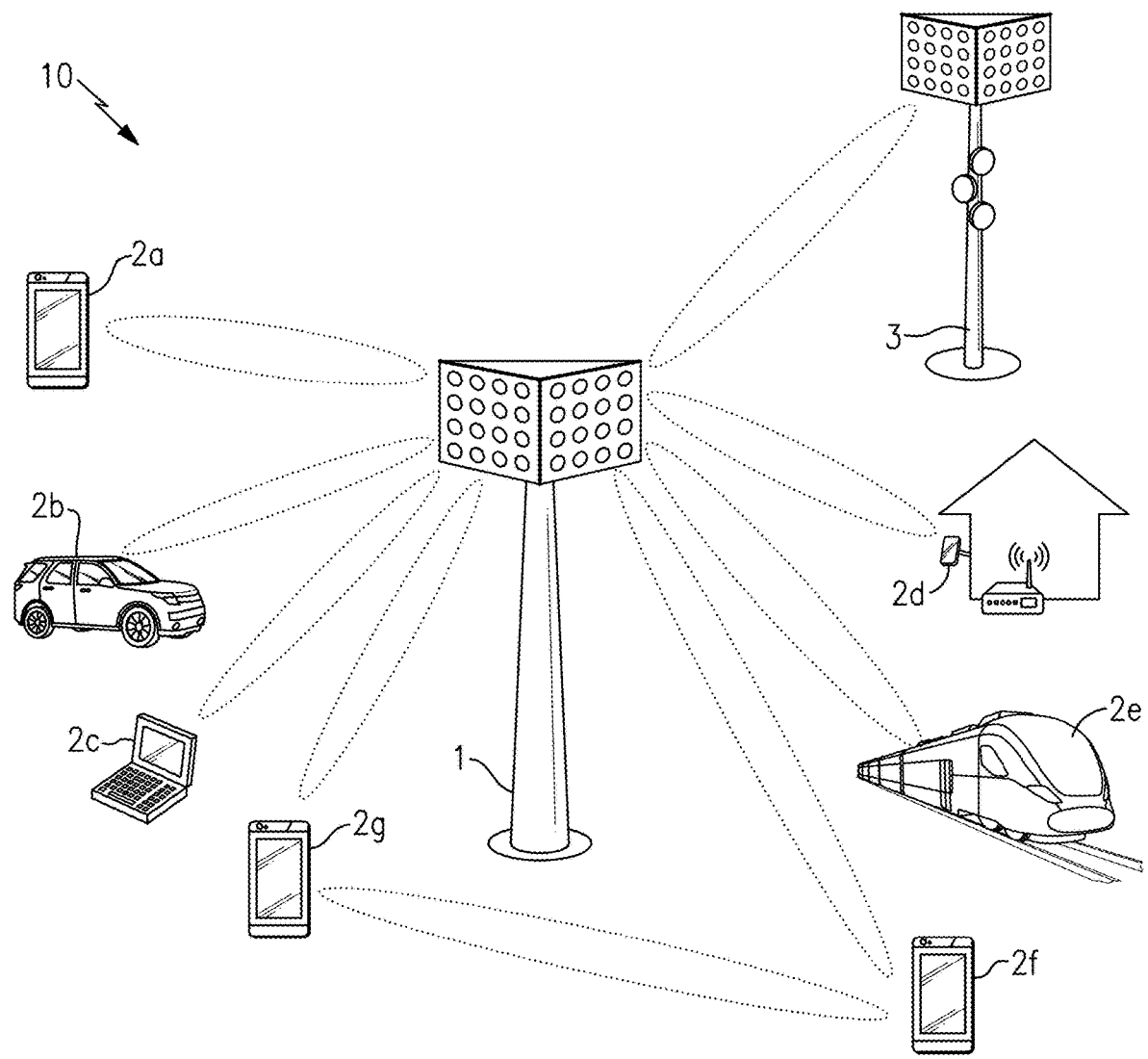
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

One advantage to multi-level supply (MLS) envelope tracking systems is that they are typically significantly more power efficient compared to continuous envelope tracking systems. However, MLS envelope tracking systems may generate high frequency edge distortion in the generated square voltage and it is desirable to filter out this distortion. However, certain filters may result in power loss, cutting into the power efficiency gains provided by using MLS envelope tracking systems. In addition, the footprint of filters that can be used to filter the MLS envelope tracking output signal to reduce noise to a desired level may be significantly larger than the MLS envelope tracking system.

Aspects of this disclosure relate to MLS envelope tracking systems that have reduced noise levels while also maintaining fast settling times (e.g., less than about 0.1 μs). Further aspects of this disclosure can address one or more of the above identified problems.

Introduction To Wireless Communication Networks

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2020). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as Wi-Fi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Introduction to Envelope Tracking

Figure 2:
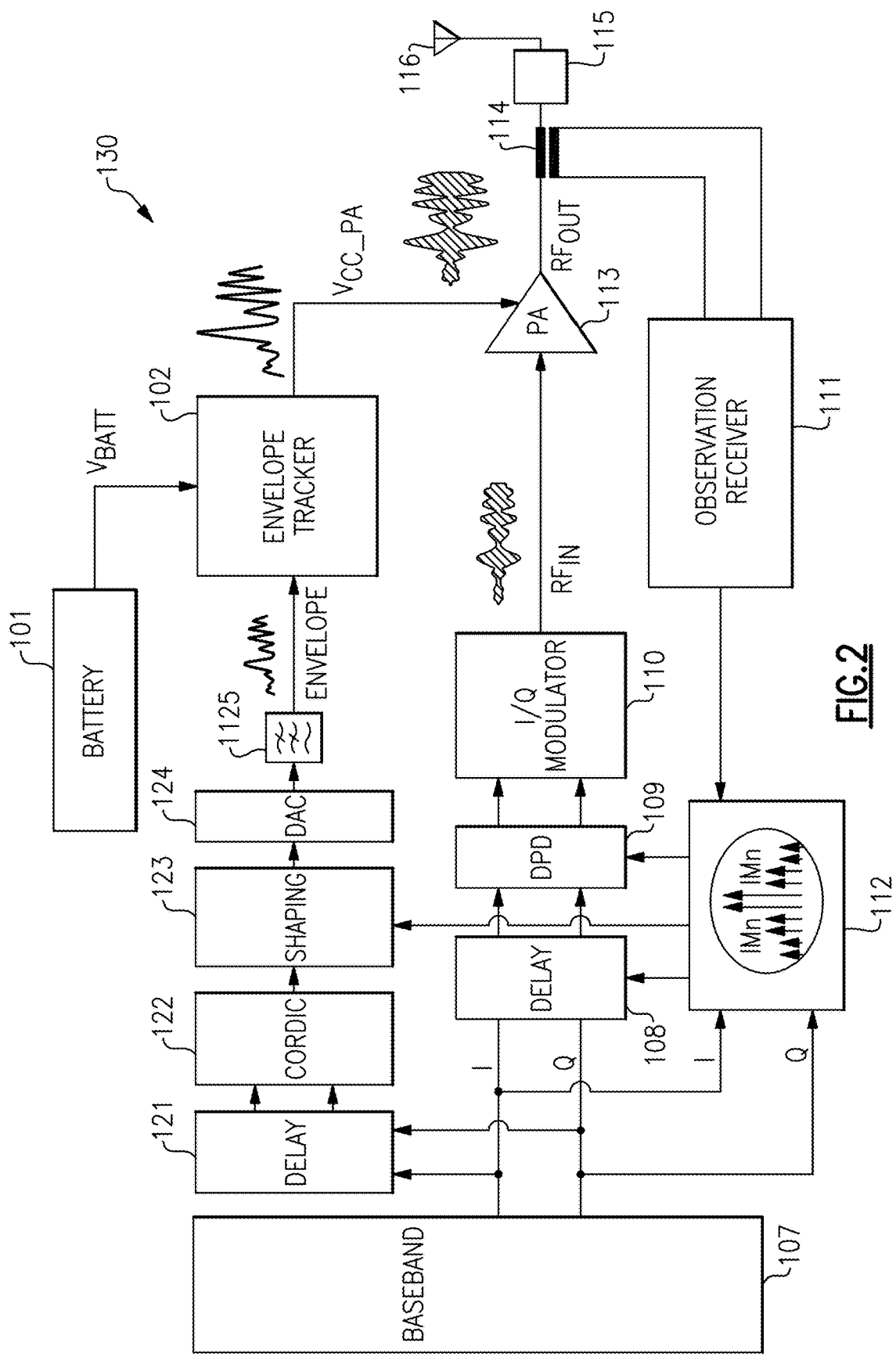
FIG. 2 is a schematic diagram of one embodiment of a communication system for transmitting RF signals.

FIG. 2 is a schematic diagram of one embodiment of a communication system 130 for transmitting RF signals. The communication system 130 includes a battery 101, an envelope tracker 102, a baseband processor 107, a signal delay circuit 108, a digital pre-distortion (DPD) circuit 109, an I/Q modulator 110, an observation receiver 111, an intermodulation detection circuit 112, a power amplifier 113, a directional coupler 114, a duplexing and switching circuit 115, an antenna 116, an envelope delay circuit 121, a coordinate rotation digital computation (CORDIC) circuit 122, a shaping circuit 123, a digital-to-analog converter 124, and a reconstruction filter 125.

The communication system 130 of FIG. 2 illustrates one example of an RF system operating with a power amplifier supply voltage controlled using envelope tracking. However, envelope tracking systems can be implemented in a wide variety of ways.

The baseband processor 107 operates to generate an I signal and a Q signal, which correspond to signal components of a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals are provided to the I/Q modulator 110 in a digital format. The baseband processor 107 can be any suitable processor configured to process a baseband signal. For instance, the baseband processor 107 can include a digital signal processor, a microprocessor, a programmable core, or any combination thereof.

The signal delay circuit 108 provides adjustable delay to the I and Q signals to aid in controlling relative alignment between the envelope signal and the RF signal $RF_{IN}$. The amount of delay provided by the signal delay circuit 108 is controlled based on amount of intermodulation detected by the intermodulation detection circuit 112.

The DPD circuit 109 operates to provide digital shaping to the delayed I and Q signals from the signal delay circuit 108 to generate digitally pre-distorted I and Q signals. In the illustrated embodiment, the pre-distortion provided by the DPD circuit 109 is controlled based on amount of intermodulation detected by the intermodulation detection circuit 112. The DPD circuit 109 serves to reduce a distortion of the power amplifier 113 and/or to increase the efficiency of the power amplifier 113.

The I/Q modulator 110 receives the digitally pre-distorted I and Q signals, which are processed to generate an RF signal $RF_{IN}$. For example, the I/Q modulator 110 can include DACs configured to convert the digitally pre-distorted I and Q signals into an analog format, mixers for upconverting the analog I and Q signals to radio frequency, and a signal combiner for combining the upconverted I and Q signals into an RF signal suitable for amplification by the power amplifier 113. In certain implementations, the I/Q modulator 110 can include one or more filters configured to filter frequency content of signals processed therein.

The envelope delay circuit 121 delays the I and Q signals from the baseband processor 107. Additionally, the CORDIC circuit 122 processes the delayed I and Q signals to generate a digital envelope signal representing an envelope of the RF signal $RF_{IN}$. Although FIG. 2 illustrates an implementation using the CORDIC circuit 122, an envelope signal can be obtained in other ways.

The shaping circuit 123 operates to shape the digital envelope signal to enhance the performance of the communication system 130. In certain implementations, the shaping circuit 123 includes a shaping table that maps each level of the digital envelope signal to a corresponding shaped envelope signal level. Envelope shaping can aid in controlling linearity, distortion, and/or efficiency of the power amplifier 113.

In the illustrated embodiment, the shaped envelope signal is a digital signal that is converted by the DAC 124 to an analog envelope signal. Additionally, the analog envelope signal is filtered by the reconstruction filter 125 to generate an envelope signal suitable for use by the envelope tracker 102. In certain implementations, the reconstruction filter 125 includes a low pass filter.

With continuing reference to FIG. 2, the envelope tracker 102 receives the envelope signal from the reconstruction filter 125 and a battery voltage $V_{BATT}$ from the battery 101, and uses the envelope signal to generate a power amplifier supply voltage $V_{CC\_PA}$ for the power amplifier 113 that changes in relation to the envelope of the RF signal $RF_{IN}$. The power amplifier 113 receives the RF signal $RF_{IN}$ from the I/Q modulator 110, and provides an amplified RF signal $RF_{OUT}$ to the antenna 116 through the duplexing and switching circuit 115, in this example.

The directional coupler 114 is positioned between the output of the power amplifier 113 and the input of the duplexing and switching circuit 115, thereby allowing a measurement of output power of the power amplifier 113 that does not include insertion loss of the duplexing and switching circuit 115. The sensed output signal from the directional coupler 114 is provided to the observation receiver 111, which can include mixers for down converting I and Q signal components of the sensed output signal, and DACs for generating I and Q observation signals from the down-converted signals.

The intermodulation detection circuit 112 determines an intermodulation product between the I and Q observation signals and the I and Q signals from the baseband processor 107. Additionally, the intermodulation detection circuit 112 controls the pre-distortion provided by the DPD circuit 109 and/or a delay of the signal delay circuit 108 to control relative alignment between the envelope signal and the RF signal $RF_{IN}$. In certain implementations, the intermodulation detection circuit 112 also serves to control shaping provided by the shaping circuit 123.

By including a feedback path from the output of the power amplifier 113 and baseband, the I and Q signals can be dynamically adjusted to optimize the operation of the communication system 130. For example, configuring the communication system 130 in this manner can aid in providing power control, compensating for transmitter impairments, and/or in performing DPD.

Although illustrated as a single stage, the power amplifier 113 can include one or more stages. Furthermore, the teachings herein are applicable to communication systems including multiple power amplifiers. In such implementations, separate envelope trackers can be provided for different power amplifiers and/or one or more shared envelope trackers can be used.

Figure 3:
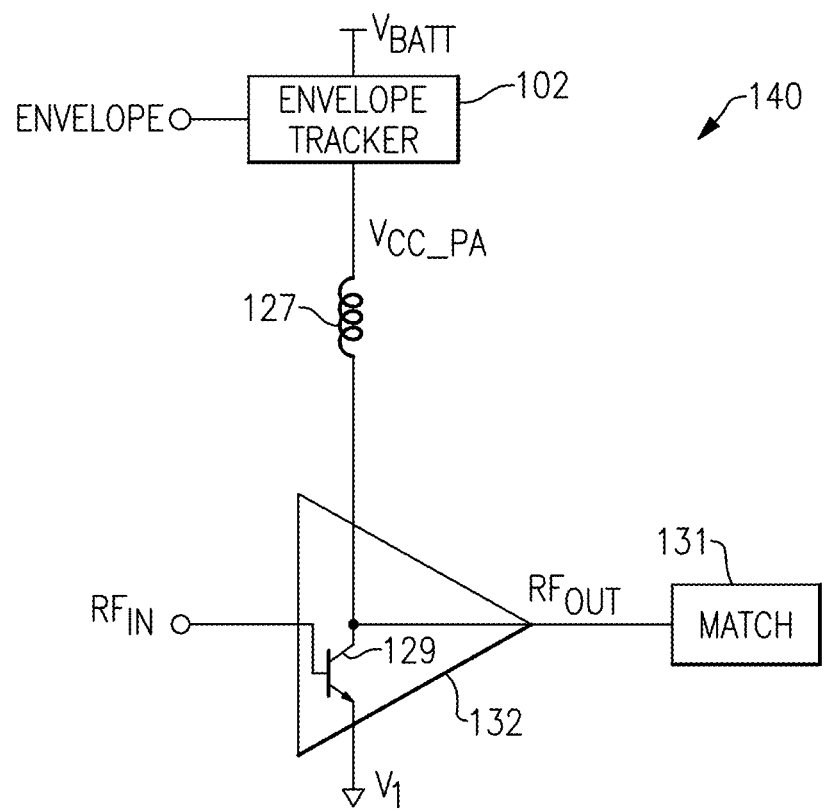
FIG. 3 is a schematic diagram of one example of a power amplifier system including an envelope tracker.

FIG. 3 is a schematic diagram of one example of a power amplifier system 140 including an envelope tracker 102. The illustrated power amplifier system 140 further includes an inductor 127, an output impedance matching circuit 131, and a power amplifier 132. The illustrated envelope tracker 102 receives a battery voltage $V_{BATT}$ and an envelope of the RF signal and generates a power amplifier supply voltage $V_{CC\_PA}$ for the power amplifier 132.

The illustrated power amplifier 132 includes a bipolar transistor 129 having an emitter, a base, and a collector. As shown in FIG. 3, the emitter of the bipolar transistor 129 is electrically connected to a power low supply voltage $V_1$, which can be, for example, a ground supply. Additionally, an RF signal ($RF_{IN}$) is provided to the base of the bipolar transistor 129, and the bipolar transistor 129 amplifies the RF signal to generate an amplified RF signal at the collector. The bipolar transistor 129 can be any suitable device. In one implementation, the bipolar transistor 129 is a heterojunction bipolar transistor (HBT).

The output impedance matching circuit 131 serves to terminate the output of the power amplifier 132, which can aid in increasing power transfer and/or reducing reflections of the amplified RF signal generated by the power amplifier 132. In certain implementations, the output impedance matching circuit 131 further operates to provide harmonic termination and/or to control a load line impedance of the power amplifier 132.

The inductor 127 can be included to provide the power amplifier 132 with the power amplifier supply voltage $V_{CC\_PA}$ generated by the envelope tracker 102 while choking or blocking high frequency RF signal components. The inductor 127 can include a first end electrically connected to the envelope tracker 102, and a second end electrically connected to the collector of the bipolar transistor 129. In certain implementations, the inductor 127 operates in combination with the impedance matching circuit 131 to provide output matching.

Although FIG. 3 illustrates one implementation of the power amplifier 132, skilled artisans will appreciate that the teachings described herein can be applied to a variety of power amplifier structures, such as multi-stage power amplifiers and power amplifiers employing other transistor structures. For example, in some implementations the bipolar transistor 129 can be omitted in favor of employing a field-effect transistor (FET), such as a silicon FET, a gallium arsenide (GaAs) high electron mobility transistor (HEMT), or a laterally diffused metal oxide semiconductor (LDMOS) transistor. Additionally, the power amplifier 132 can be adapted to include additional circuitry, such as biasing circuitry.

Figure 4A:
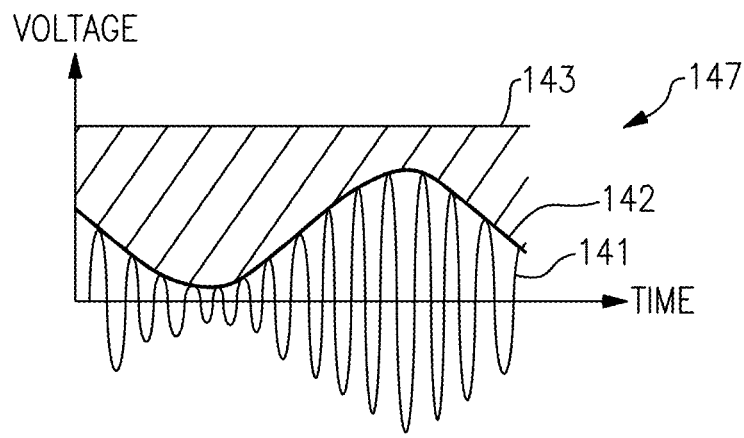
FIG. 4A shows a first example of a power amplifier supply voltage versus time.
Figure 4B:
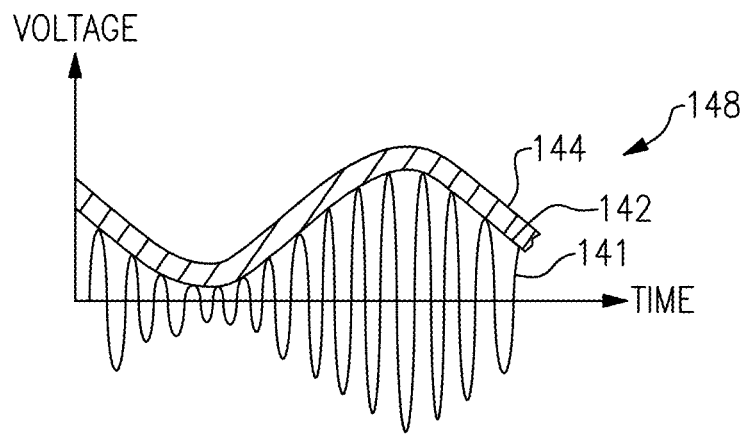
FIG. 4B shows a second example of a power amplifier supply voltage versus time.

FIGS. 4A and 4B show two examples of power amplifier supply voltage versus time.

In FIG. 4A, a graph 147 illustrates one example of the voltage of an RF signal 141 and a power amplifier supply voltage 143 versus time. The RF signal 141 has an envelope 142.

It can be important that the power amplifier supply voltage 143 of a power amplifier has a voltage greater than that of the RF signal 141. For example, powering a power amplifier using a power amplifier supply voltage that has a magnitude less than that of the RF signal can clip the RF signal, thereby creating signal distortion and/or other problems. Thus, it can be important the power amplifier supply voltage 143 be greater than that of the envelope 142. However, it can be desirable to reduce a difference in voltage between the power amplifier supply voltage 143 and the envelope 142 of the RF signal 141, as the area between the power amplifier supply voltage 143 and the envelope 142 can represent lost energy, which can reduce battery life and increase heat generated in a wireless device.

In FIG. 4B, a graph 148 illustrates another example of the voltage of an RF signal 141 and a power amplifier supply voltage 144 versus time. In contrast to the power amplifier supply voltage 143 of FIG. 4A, the power amplifier supply voltage 144 of FIG. 4B changes in relation to the envelope 142 of the RF signal 141. The area between the power amplifier supply voltage 144 and the envelope 142 in FIG. 4B is less than the area between the power amplifier supply voltage 143 and the envelope 142 in FIG. 4A, and thus the graph 148 of FIG. 4B can be associated with a power amplifier system having greater energy efficiency.

Figure 5A:
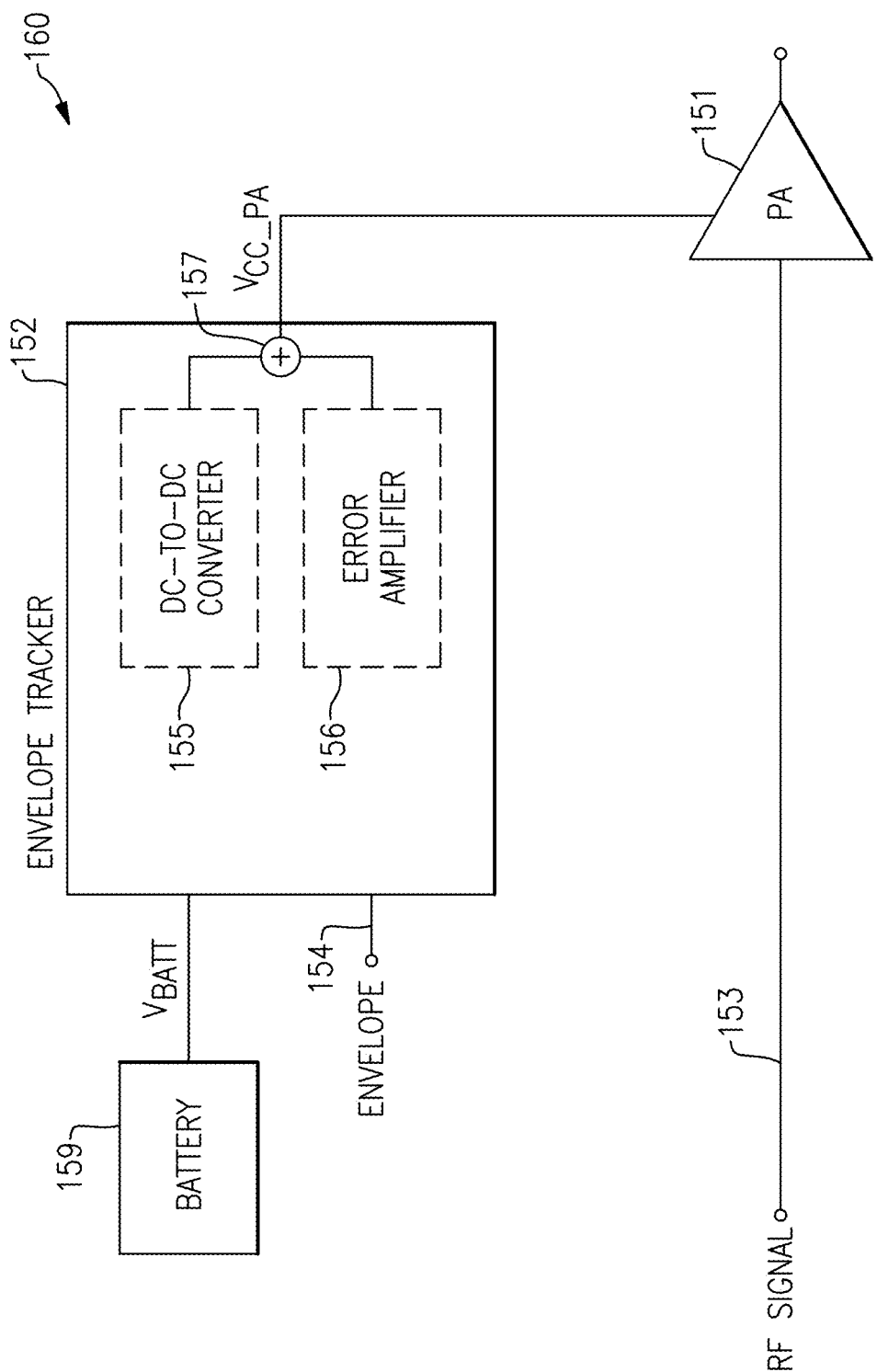
FIG. 5A is a schematic diagram of a power amplifier system according to one embodiment.

FIG. 5A is a schematic diagram of a power amplifier system 160 according to one embodiment. The power amplifier system 160 includes a power amplifier 151, an envelope tracker 152, and a battery 159. The power amplifier 151 provides amplification to a radio frequency signal 153.

The envelope tracker 152 receives a battery voltage $V_{BATT}$ from the battery 159 and an envelope signal 154 corresponding to an envelope of the radio frequency signal 153. Additionally, the envelope tracker 152 generates a power amplifier supply voltage $V_{CC\_PA}$, which supplies power to the power amplifier 151.

As shown in FIG. 5A, the envelope tracker 152 includes a DC-to-DC converter 155 and an error amplifier 156 that operate in combination with one another to generate the power amplifier supply voltage $V_{CC\_PA}$ based on the envelope signal 154. Additionally, an output of the DC-to-DC converter 155 and an output of the error amplifier 156 are combined using a combiner 157.

In the illustrated embodiment, the DC-to-DC converter 155 and the error amplifier 156 operate in parallel with one another to control the voltage level of the power amplifier supply voltage $V_{CC\_PA}$. The combination of the DC-to-DC converter 155 and the error amplifier 156 provides effective tracking of the envelope signal 154, since the DC-to-DC converter 155 provides superior tracking of low frequency components of the envelope signal 154 while the error amplifier 156 provide superior tracking of high frequency components of the envelope signal 154.

Figure 5B:
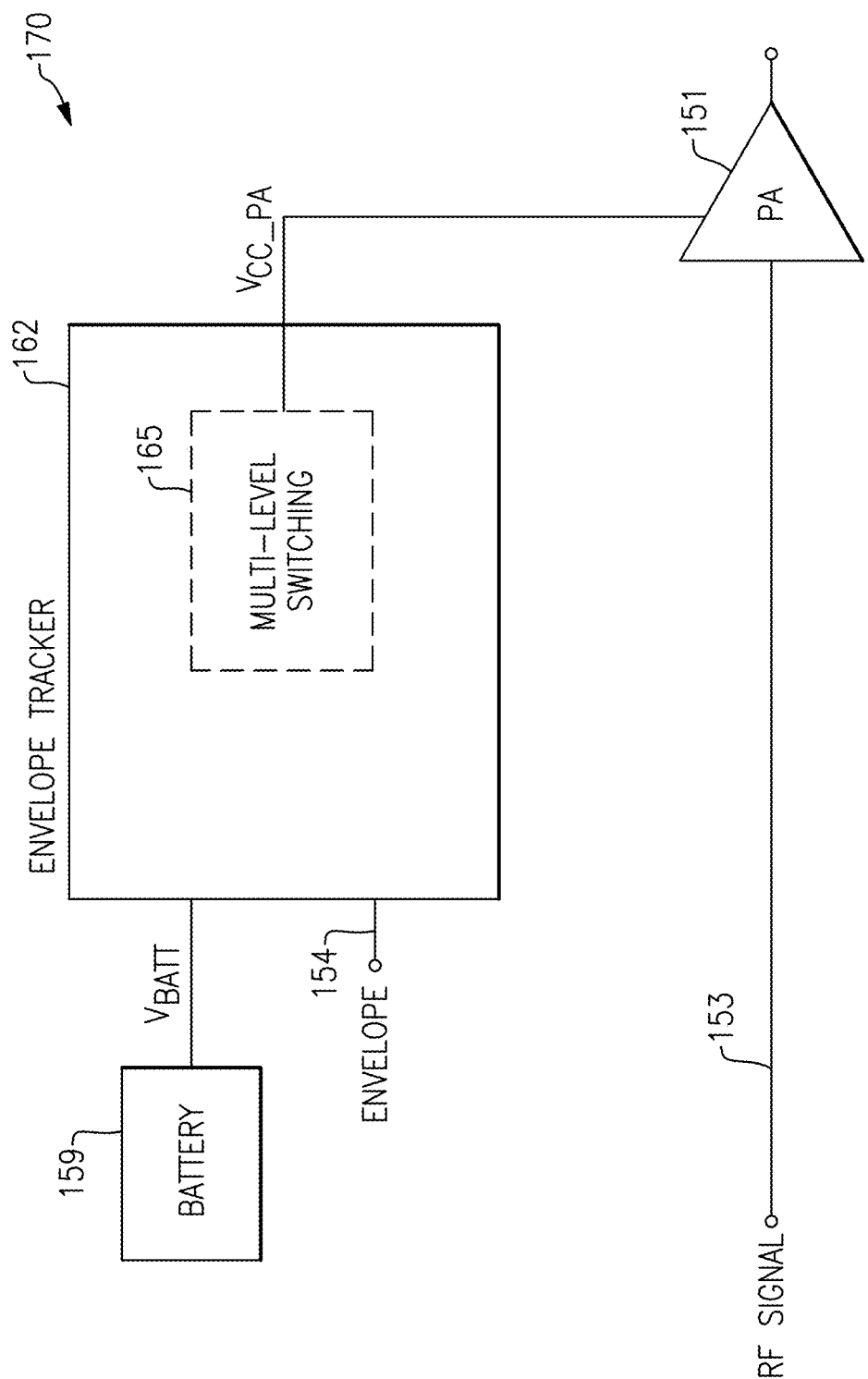
FIG. 5B is a schematic diagram of a power amplifier system according to another embodiment.

FIG. 5B is a schematic diagram of a power amplifier system 170 according to another embodiment. The power amplifier system 170 includes a power amplifier 151, a battery 159, and an envelope tracker 162. The power amplifier 151 provides amplification to a radio frequency signal 153.

The envelope tracker 162 of FIG. 5B illustrates another embodiment of an envelope tracker. However, the teachings herein are applicable to envelope trackers implemented in a wide variety of ways. Accordingly, other implementations are possible.

As shown in FIG. 5B, the envelope tracker 162 receives a battery voltage $V_{BATT}$ from the battery 159 and an envelope signal 154 corresponding to an envelope of the radio frequency signal 153. Additionally, the envelope tracker 162 generates a power amplifier supply voltage $V_{CC\_PA}$, which supplies power to the power amplifier 151.

The illustrated envelope tracker 162 includes a multi-level switching circuit 165. In certain implementations, the multi-level switching circuit 165 includes a multi-output DC-to-DC converter for generating regulated voltages of different voltage levels, switches for controlling selection of a suitable regulated voltage over time based on the envelope signal 154, and a filter for filtering the output of the switches to generate the power amplifier supply voltage $V_{CC\_PA}$.

Figure 6:
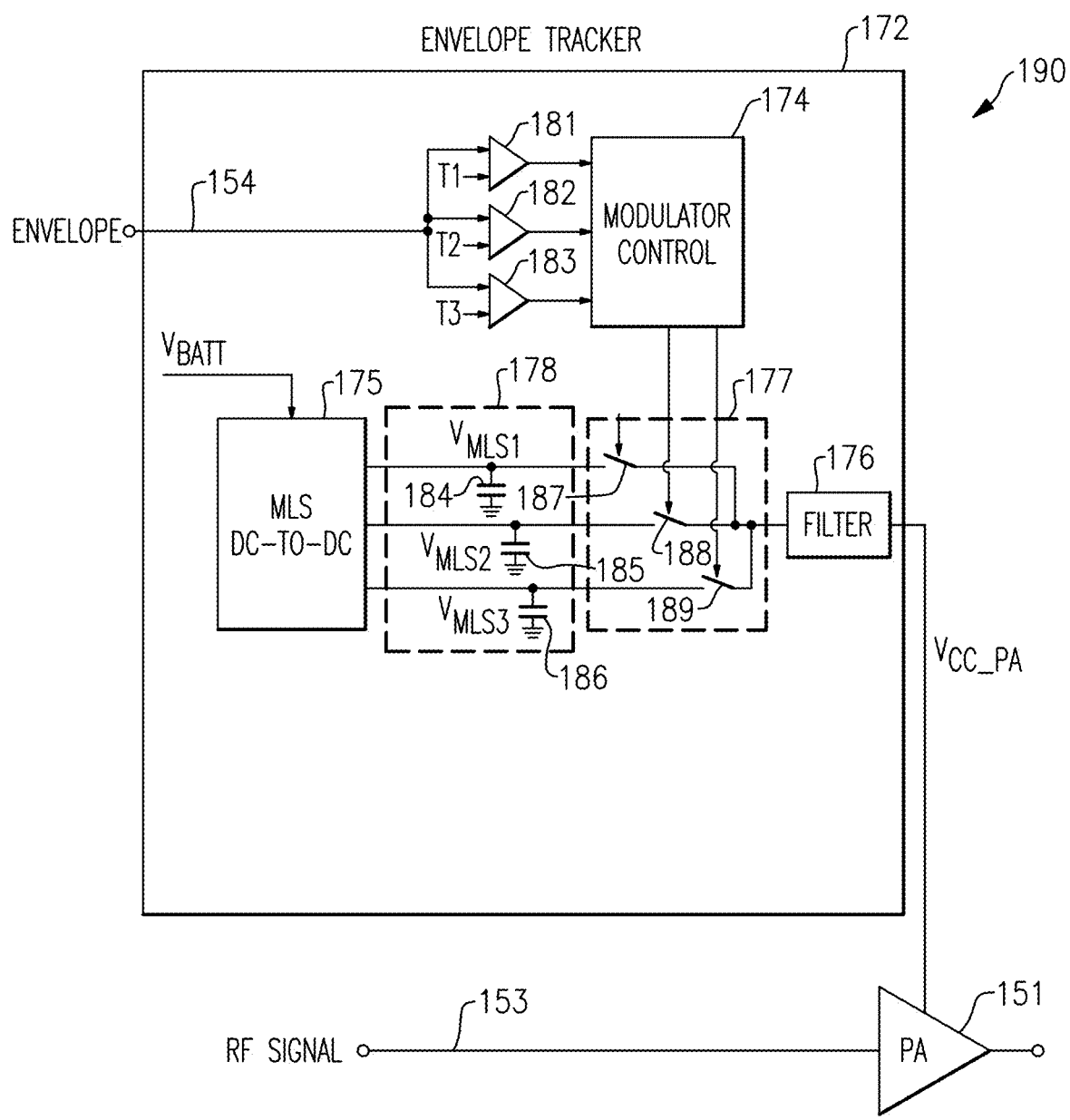
FIG. 6 is a schematic diagram of a power amplifier system according to another embodiment.

FIG. 6 is a schematic diagram of a power amplifier system 190 according to another embodiment.

The power amplifier system 190 includes a power amplifier 151 and an envelope tracker 172. The power amplifier 151 provides amplification to a radio frequency signal 153. As shown in FIG. 6, the envelope tracker 172 receives an envelope signal 154 corresponding to an envelope of the radio frequency signal 153. Additionally, the envelope tracker 172 generates a power amplifier supply voltage $V_{CC\_PA}$, which supplies power to the power amplifier 151.

In the illustrated embodiment, the envelope tracker 172 includes a modulator control circuit 174, a multi-level supply (MLS) DC-to-DC converter 175, a modulator output filter 176, a modulator switch bank 177, a decoupling capacitor bank 178, a first comparator 181, a second comparator 182, and a third comparator 183. The decoupling capacitor bank 178 includes a first capacitor 184, a second capacitor 185, and a third capacitor 186. Additionally, the modulator switch bank 177 includes a first switch 187, a second switch 188, and a third switch 189.

The envelope tracker 172 of FIG. 6 illustrates another embodiment of an envelope tracker. However, the teachings herein are applicable to envelope trackers implemented in a wide variety of ways. Accordingly, other implementations are possible.

In the illustrated embodiment, the MLS DC-to-DC converter 175 generates a first regulated voltage $V_{MLS1}$, a second regulated voltage $V_{MLS2}$, and a third regulated voltage $V_{MLS3}$ based on providing DC-to-DC conversion of a battery voltage $V_{BATT}$. While illustrated as outputting three regulated voltages, the MLS DC-to-DC converter 175 can generate more or fewer regulated voltages. In certain implementations, one or more of the regulated voltages are boosted voltages having a voltage level greater than the voltage level of the battery voltage $V_{BATT}$.

The decoupling capacitor bank 178 stabilizes the regulated voltages generated by the MLS DC-to-DC converter 175. For example, the first decoupling capacitor 184 provides decoupling to the first regulated voltage $V_{MLS1}$, the second decoupling capacitor 185 provides decoupling for second regulated voltage $V_{MLS2}$, and the third decoupling capacitor 186 provides decoupling for the third regulated voltage $V_{MLS3}$. Although three decoupling capacitors are shown, more or fewer decoupling capacitors can be included.

The first to third comparators 181-183 compare the amplified envelope signal to a first threshold T1, a second threshold T2, and a third threshold T3, respectively. The results of the comparisons are provided to the modulator control circuit 174, which processes the comparisons to select particular switches of the modulator switch bank 177. In certain implementations, the modulator control circuit 174 provides at least one of coding or dithering when controlling the modulator switch bank 177 to compensate for artifacts arising from opening and closing thee switches. Although an example with three comparators is shown, more or fewer comparators can be used.

The filter 176 filters the output of the modulator switch bank 177 to generate the power amplifier supply voltage $V_{CC\_PA}$. By controlling the selection of the switches 187-189 over time based on the envelope signal 154, the envelope tracker 172 controls the voltage level of the power amplifier supply voltage $V_{CC\_PA}$ to track the envelope signal 154.

Pulse Shaping of Voltage Transitions in Multi-Level Envelope Tracking Systems

Aspects of this disclosure relate to multilevel envelope tracking power supplies. It is desirable for multilevel envelope tracking power supplies to provide a fast, varying supply voltage to an RF power amplifier. In the process of converting power from a power source, such as a battery, to a fast varying voltage source suitable for an RF PA, noise may be unavoidably added to the signal. The types of noise added to the signal may be any type of noise resulting from electronic noise and/or distortion.

A multi-level power supply may add considerable amounts of harmonic distortion due to the nature of switching between different discrete levels with a square edge. However, it can still be desirable to use square edges in order to minimize the energy lost in the transistors of the multi-level power supply when the transistors operate in the triode region. Compared to a continuous envelope tracking system (which typically use a class AB amplifier and therefore have current running through a transistor with a significant voltage simultaneously present across the transistor), a multi-level power supply typically uses transistors as switches, with a comparatively low voltage drop through the transistors as current passes through the transistors, resulting in significantly less power loss.

One consequence switching in a multi-level power supply is that a square voltage is generated, which can result in high frequency edge distortion. It can be desirable to filter high frequency edge distortion from the generated square voltage. One technique for filtering high frequency edge distortion is via implementing one or more low pass filters to reconstruct the signal. However, such low pass filters result in power losses, which reduce at least some of the power efficiency gains provided by using a multi-level power supply.

In some embodiments, a $4^{th}$ order filter can be used to filter out the high frequency edge distortion, however, such filters may include at least 2 inductors. The footprint size of filtering inductors is often many times larger than the size of the integrated circuit elements used for controlling the current flowing through the inductors. The particular frequencies at which noise is present and undesirable can depend on the bandwidth and spectral content of the RF being transmitted. Certain cellular radio systems provide for variable bandwidth (e.g., LTE, 5G NR, Wi-Fi, etc.) and thus, it is desirable to provide multi-level filters that support variable bandwidths to implement these communication standards. In order to change the bandwidth of a $4^{th}$ order filter by more than an octave when implementing variable bandwidths, the $4^{th}$ order filter may require both variable inductors and capacitors, which typically results in using more than inductor to replace each discrete inductor and capacitor.

In one example, implementations with a fixed 10 or 15 MHz LC filter may not allow for full efficiency for 100 MHz bandwidth of signal. Such filters are designed with the worst noise requirement in mind, which is often one of the LTE Network Signaling cases for co-existence. This limits the bandwidth of signals that can be passed through the filter.

Figure 7A:
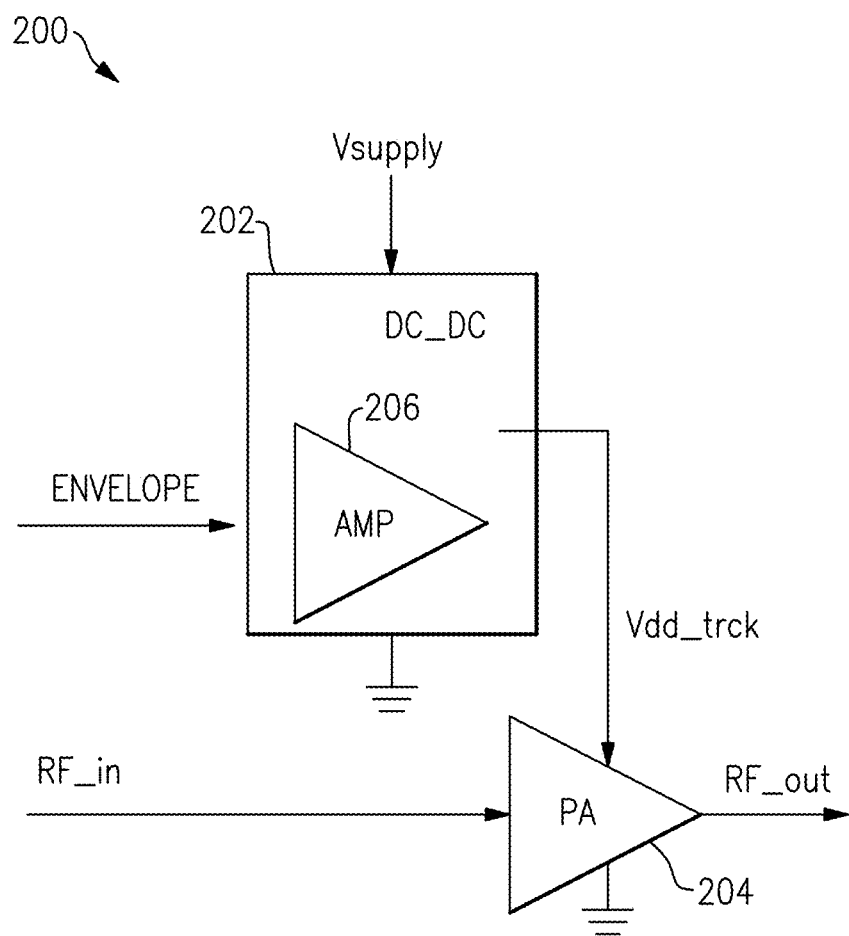
FIG. 7A is a schematic diagram of a multi-level envelope tracking power supply in accordance with aspects of this disclosure.

Aspects of this disclosure relate multi-level envelope tracking power supplies. One design goal of such power supplies is to provide a fast varying supply voltage to an RF power amplifier. FIG. 7A is a schematic diagram of a multi-level envelope tracking power supply 200 in accordance with aspects of this disclosure.

With reference to FIG. 7A, the multi-level envelope tracking power supply 200 includes a DC/DC converter 202 (also referred to as an envelope tracker) and an RF power amplifier 204. The power amplifier 204 is configured to receive an RF_input signal RF_in, a first voltage source Vdd_trck, a second voltage supply (e.g., ground in the illustrated embodiment), and output an RF output signal RF out. The DC/DC converter 202 is configured to receive an envelope signal Envelope, a first voltage supply Vsupply, the second voltage supply (e.g., ground in the illustrated embodiment), and generate the first voltage source Vdd_trek. In some implementations, the DC/DC converter 202 can function as a multi-level power supply to generate the first voltage source Vdd_trck at one of a plurality of discrete voltage levels.

The DC/DC converter 202 can also include an amplifier 206 configured to generate the first voltage source Vdd_trck. Although the second voltage supply is illustrated as ground, aspects of this disclosure are not limited thereto and the second voltage supply may be a second volage different from the first voltage supply Vsupply. In addition, the second voltage supply provided to the DC/DC converter 202 may be different from the second voltage supply provided to the power amplifier 204 depending on the implementation. In some embodiments, the first voltage supply Vsupply can be provided from a battery (such as the battery 159 illustrated in FIGS. 5A and 5B).

Figure 7B:
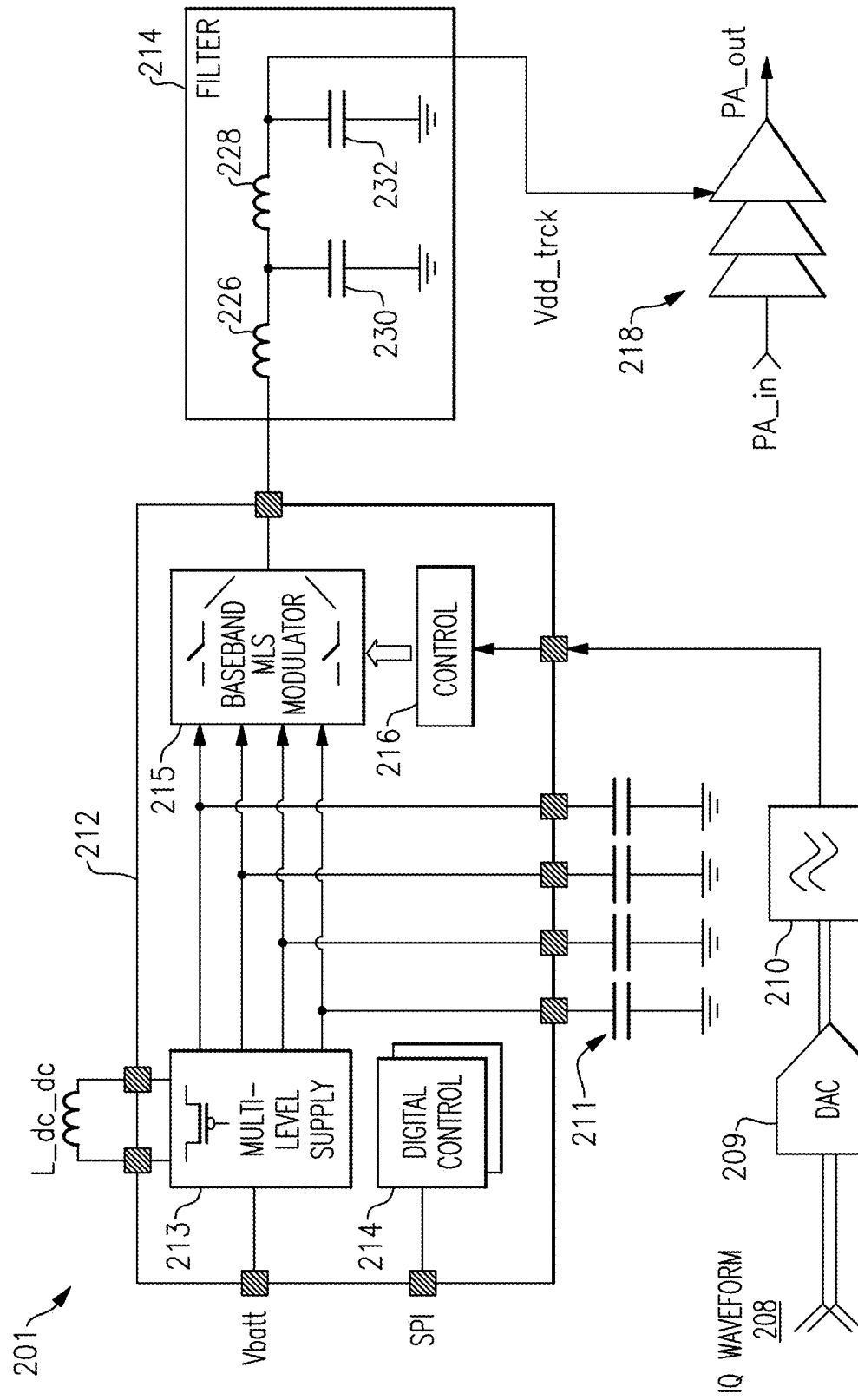
FIG. 7B is a schematic diagram of another multi-level envelope tracking power supply in accordance with aspects of this disclosure.

FIG. 7B is a schematic diagram of another multi-level envelope tracking power supply 201 in accordance with aspects of this disclosure. The multi-level envelope tracking power supply 201 includes an IQ waveform 208, a DAC 209, a first filter 210, a set of capacitors 211, a multi-level switch (MLS) matrix 212, a second filter 214, and one or more power amplifiers 218. The one or more power amplifiers 218 are configured to receive an input RF signal PA_in and a first voltage source Vdd_trck and generate an amplified output RF signal PA_out based on the input RF signal PA_in and the first voltage source Vdd_trck.

The MLS matrix 212 is configured to receive an envelope tracking signal from the first filter 210, a battery voltage Vbatt, and a control signal SPI. The MLS matrix 212 is configured to generate an output voltage which is then filtered via the second filter 214 to provide the first voltage source Vdd_trck. The MLS matrix 212 may also be connected to an external inductor L_dc_dc.

The MLS matrix 212 includes a multi-level supply 213, a digital controller 214, a baseband MLS modulator 215, and a controller 216. The digital controller 214 is configured to receive the control signal SPI and control one or more of the multi-level supply 213, the baseband MLS modulator 215, and the controller 216. The multi-level power supply 213 is configured to receive the battery voltage Vbatt and generate a plurality of discrete voltage levels. The controller 216 is configured to receive the envelope signal and generate a control signal for controlling the baseband MLS modulator 215. The baseband MLS modulator 215 is configured to select one of the plurality of discrete voltage levels based on the control signal received from the controller 216 and output the selected discrete level to the second filter 214. The second filter 214 includes a first inductor 226, a second inductor 228, a first capacitor 230, and a second capacitor 232, however, more or fewer inductors and/or capacitors can be included in other implementations. The second filter 214 is configured to filter the output received from the MLS matrix 212 to generate the first voltage source Vdd_trck.

Figure 7C:
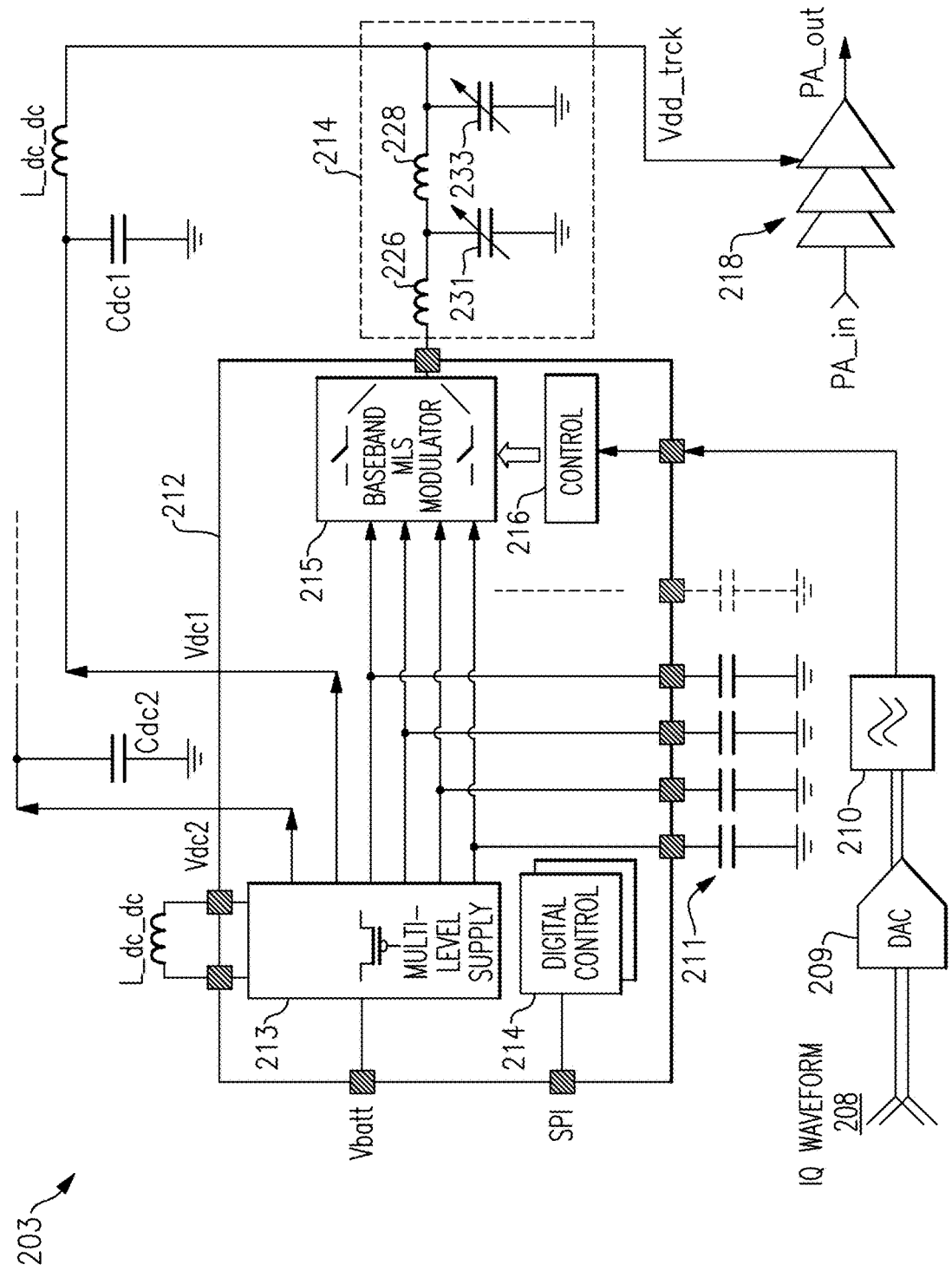
FIG. 7C is a schematic diagram of yet another multi-level envelope tracking power supply in accordance with aspects of this disclosure.

FIG. 7C is a schematic diagram of yet another multi-level envelope tracking power supply 203 in accordance with aspects of this disclosure. The multi-level envelope tracking power supply 201 includes an IQ waveform 208, a DAC 209, a first filter 210, a set of capacitors 211, a multi-level switch (MLS) matrix 212, a second filter 214, and one or more power amplifiers 218. The one or more power amplifiers 218 are configured to receive an input RF signal PA_in and a first voltage source Vdd_trck and generate an amplified output RF signal PA_out based on the input RF signal PA_in and the first voltage source Vdd_trck. The multi-level envelope tracking power supply 203 is similar to the multi-level envelope tracking power supply 201 of FIG. 7B with the inclusion of additional capacitors Cdc1 and Cdc2 and an additional inductor Ldc_dc. These additional components Cdc1, Cdc2, and Ldc_dc are arranged to provide a dc-dc buck/boost when generating the first voltage source Vdd_trck.

Figure 8:
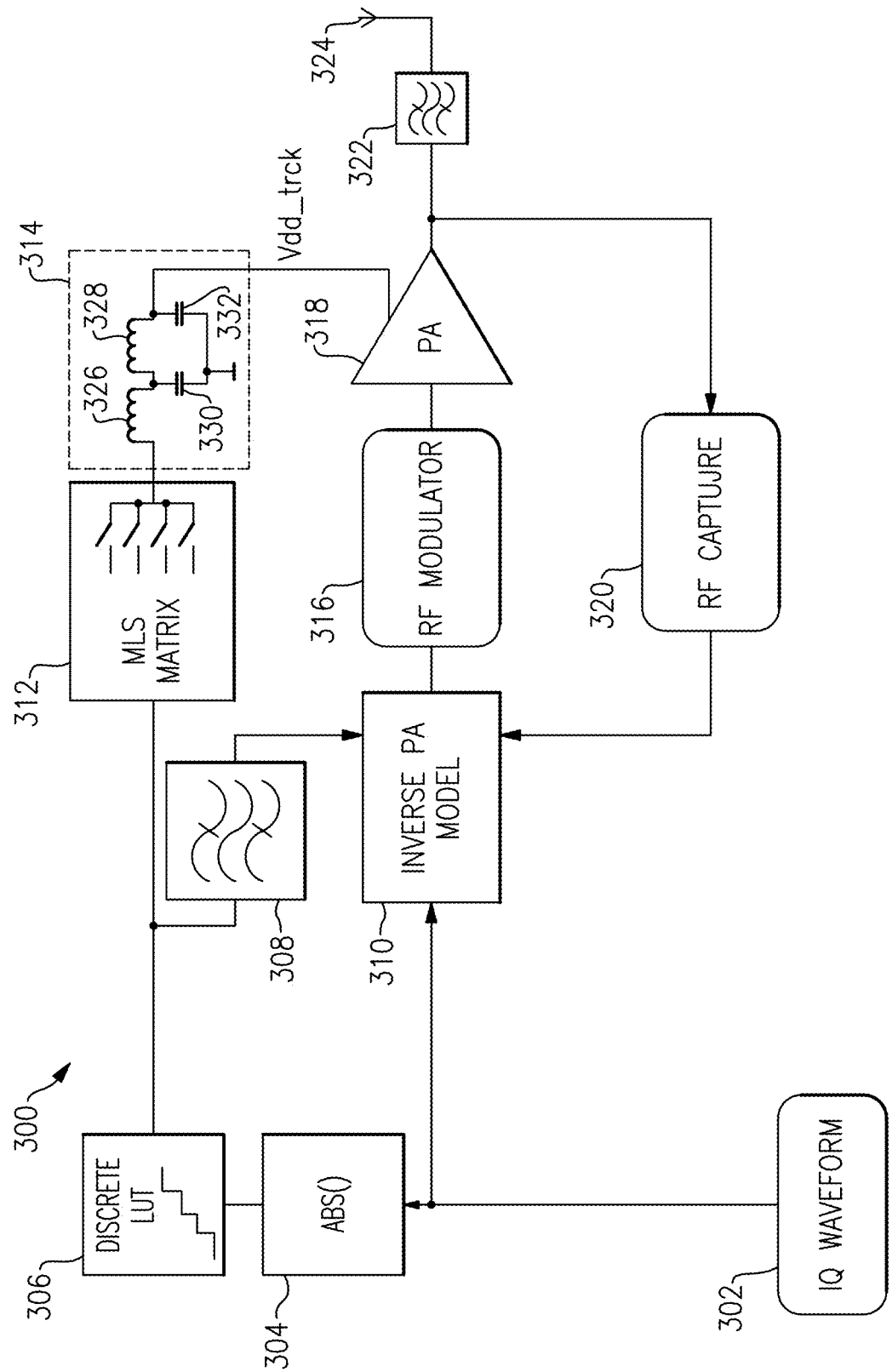
FIG. 8 is a schematic diagram of another multi-level envelope tracking power supply in accordance with aspects of this disclosure.

FIG. 8 is a schematic diagram of another multi-level envelope tracking power supply 300 in accordance with aspects of this disclosure. The power supply 300 includes an IQ waveform source 302, an absolute value block 304, a discrete look-up-table 306, a first filter 308, an inverse power amplifier model 310, a multi-level switch (MLS) matrix 312 (also referred to as an MLS switch matrix), a second filter 314, an RF modulator 316, a power amplifier 318, an RF capture circuit 320, a duplexing and switching circuit 322, and an antenna 324.

Depending on the implementation, some of the bocks may be implemented in firmware (e.g., they may be executed on the baseband processor 107 or another processor) while others may be implemented in hardware. In one example embodiment, the IQ waveform source 302, the absolute value block 304, the discrete look-up-table 306, the first filter 308, and the inverse power amplifier model 310 may be implemented in firmware while the MLS matrix 312, the second filter 314, the RF modulator 316, the power amplifier 318, the RF capture circuit 320, the duplexing and switching circuit 322, and the antenna 324 may be implemented in hardware. In some embodiments, the first filter 308 may be a Vcc LP digital filter model. In the illustrated embodiment, the second filter 314 includes a first inductor 326, a second inductor 328, a first capacitor 330, and a second capacitor 332, however, more or fewer inductors and/or capacitors can be included in other implementations.

With reference to FIGS. 7 and 8, in the process of converting power from the first voltage supply Vsupply (e.g., which may be received from a battery) to a fast, varying voltage source suitable for the power amplifier 204 or 318, the DC/DC converter 202 or MLS matrix 312 may introduce a non-zero amount of noise into the first voltage source Vdd_trek provided to the power amplifier 204 or 318. As used herein, "noise" generally refers to noise in a broad sense which can be the result of electronic noise and/or distortion. In certain situations, the multi-level power supply 200 or 300 may add considerable amounts of harmonic distortion due to the nature of switching between different levels with a square edge.

Figure 9:
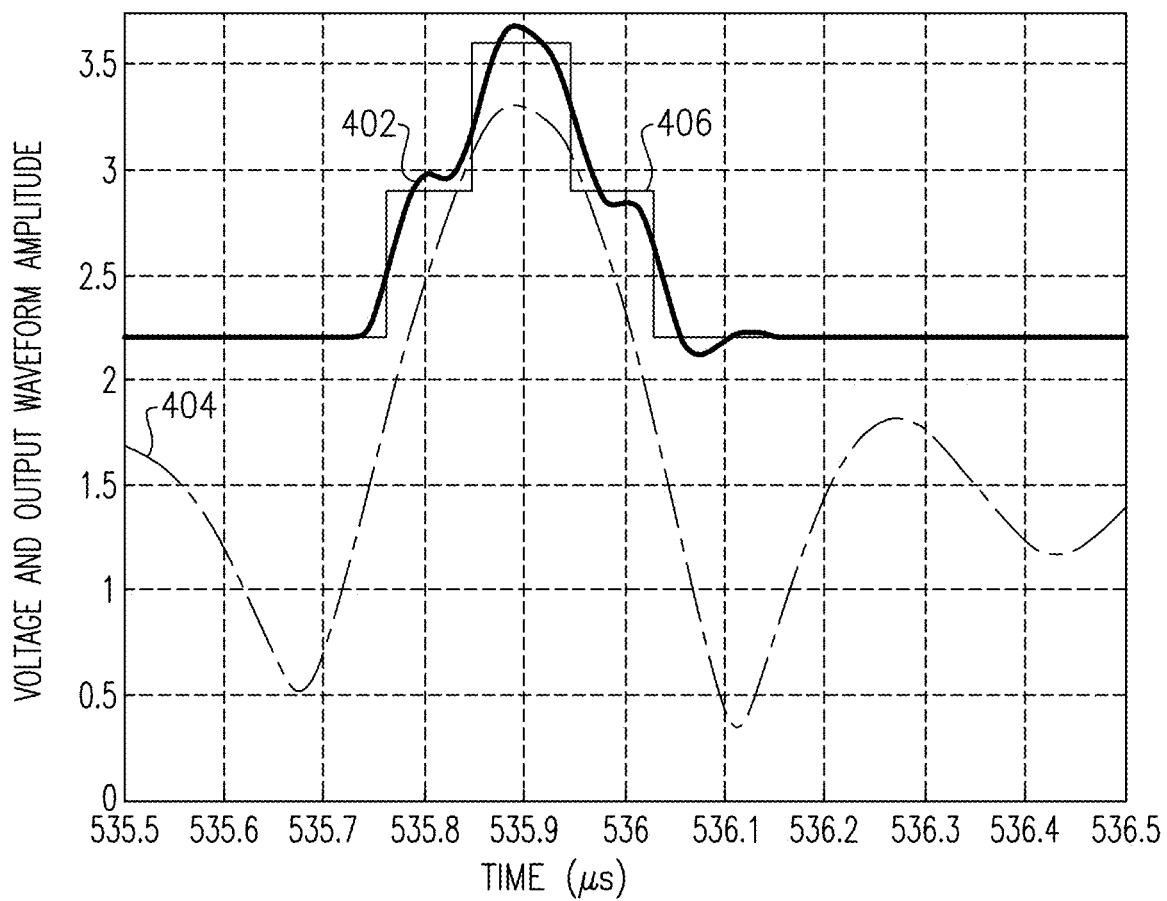
FIG. 9 illustrate an MLS filtered waveform that tracks an RF amplitude in accordance with aspects of this disclosure.

FIG. 9 illustrate an MLS filtered waveform 402 that tracks an RF amplitude 404 in accordance with aspects of this disclosure. The MLS filtered waveform 402 may correspond to the voltage source Vdd_trck provided to the power amplifier 318 as generated by the MLS matrix 312 and filtered by the second filter 314 of FIG. 8. Also shown is a square wave 406 as generated by the MLS matrix 312 prior to filtering by the second filter 314 and overlaid on the MLS filtered waveform 402 for comparison.

As shown in FIG. 9, the second filter 314 is able to achieve fast settling times (e.g., less than about 0.1 μs) while keeping the RF spectrum at a good level. However, there is still a significant amount of noise present in the MLS filtered waveform 302 shown by the deviations from the square wave 406. Aspects of this disclosure can reduce the amount of noise in an MLS filtered waveform compared to the embodiment illustrated in FIG. 9 while still ensuring that the MLS matrix 312 spends a signification amount of time (e.g., more than 75% of the time in some implementations) at a fixed voltage level in order to increase efficiency.

One advantage to using square edges for transitions in the voltage source provided to the power amplifier 318 (e.g., the MLS filtered waveform 302) is to reduce the amount of energy lost in transistors (such as those present in the MLS matrix 312) when the transistors operate in the triode region. Compared to a continuous envelope tracking system which typically use a class AB amplifier, and therefore have current run through one or more transistors with a significant voltage simultaneously present across the transistor(s), a multi-level power supply uses transistors as switches, with a low voltage drop through the transistors as current passes through, resulting in less power loss.

One consequence of switching in a multi-level power supply is that a square voltage is generated, resulting in high frequency edge distortion which is desirable to be filtered. Implementing a low pass filter to reconstruct the signal result in power losses that cut against the reduced power losses gained by using the switching of a multi-level power supply. For example, a $4^{th}$ order filter may involve the use of at least 2 inductors. The footprint size of the filtering inductors is many times larger than the size of the integrated circuit elements controlling the current though the multi-level switches. Since the frequencies at which noise is present and undesirable depend on the bandwidth and spectral content of the RF signal being transmitted, it is desirable to provide a variable bandwidth for the filter. This can be particularly desirable for cellular radio systems with variable bandwidth, such as LTE, 5G NR, and/or Wi-Fi. Changing the bandwidth of a $4^{th}$ order filter by more than an octave may involve the use of variable inductors and/or capacitors, which can result in using additional variable inductors and/or capacitors to replace each discrete inductor/capacitor.

$4^{th}$ order LC Vcc filters may be fixed for the narrowest, most restricted bandwidth in terms of noise. Thus, when using a $4^{th}$ order filter for wider bandwidths, the efficiency of the $4^{th}$ order filter may be relatively poor. One way to improve the bandwidth of such a $4^{th}$ order filter is to make the filter adjustable. However, because the filter carries all of the power amplifier current, large switches may be used to handle the current, which makes possible implementations of an adjustable $4^{th}$ order impractical for many applications.

Aspects of this disclosure address the above problems by providing an MLS envelope tracking system that can improve efficiency and/or noise for a larger bandwidth. A wide Vcc filter can be used for wider bandwidth and a narrow filter can be used to filter noise for narrower bandwidth, including cases such as the LTE NS_cases. To implement such a filter, the four discrete components forming a typical LC ladder $4^{th}$ order supply filter can be changed.

Figure 10:
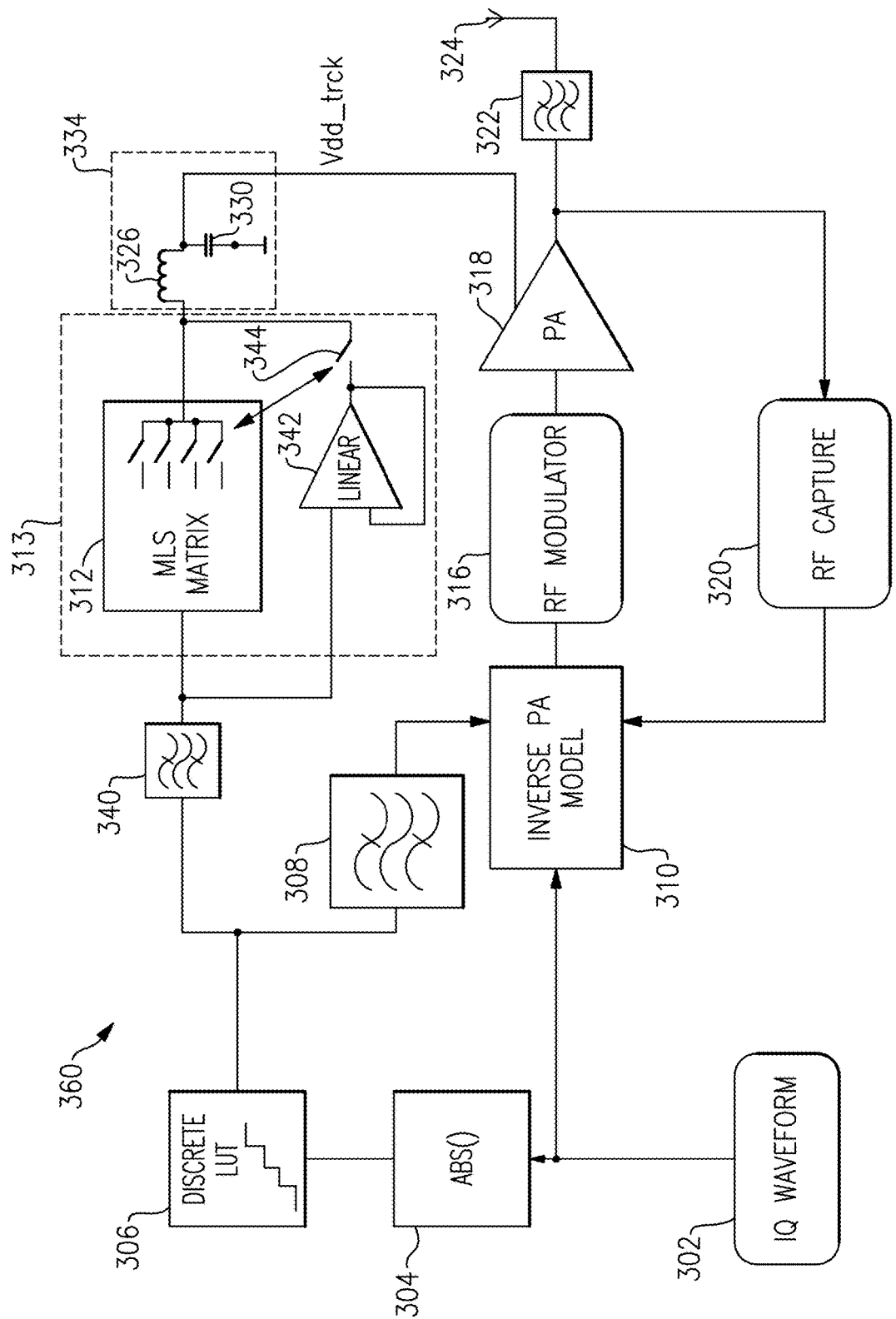
FIG. 10 is a schematic diagram of another multi-level envelope tracking power supply in accordance with aspects of this disclosure.

FIG. 10 is a schematic diagram of another multi-level envelope tracking power supply 360 in accordance with aspects of this disclosure. The power supply 360 includes an IQ waveform source 302, an absolute value block 304, a discrete look-up-table 306, a first filter 308, an inverse power amplifier model 310, and MLS modulator 313, a second filter 334, an RF modulator 316, a power amplifier 318, an RF capture circuit 320, a duplexing and switching circuit 322, an antenna 324, and a pulse shaping filter 340. The MLS modulator 313 includes an MLS matrix 312, a linear amplifier 342, and a switch 344. Although not illustrated in detail, the MLS matrix 312 can be implemented in a manner similar to the envelope tracker 172 shown in FIG. 6, although other embodiments are also possible. The second filter 334 includes an inductor 326 and a capacitor 330. The second filter 334 may form a low-pass filter configured to filter frequencies above a predetermined threshold value.

Depending on the implementation, some of the bocks may be implemented in firmware (e.g., they may be executed on the baseband processor 107) while others may be implemented in hardware. In one example embodiment, the IQ waveform source 302, the absolute value block 304, the discrete look-up-table 306, the first filter 308, the inverse power amplifier model 310, the RF modulator 316, the power amplifier 318, and the RF capture circuit 320 are implement in firmware while the pulse shaping filter 340, the MLS matrix 312, and the linear amplifier 342 are implemented in hardware.

The out of MLS modulator 313 may be a combination of an analog controlled output (e.g., from the linear amplifier 342) and a digital output (e.g., from the MLS matrix 312). The MLS modulator 313 is configured such that the output of the MLS modulator 313 follows the input to the MLS modulator 313. In some implementations, the input to the MLS modulator 313 is analog and can be measured as having soft transitions with a variable shaping dependent on the RF bandwidth being transmitted. The pulse shaping filter 340 can be implemented in either analog or digital technology. The pulse shaping filter 340 can further provide variable bandwidth to provide a compromise between noise and efficiency.

The multi-level envelope tracking power supply 360 of FIG. 10 is configured to use an analog system (e.g., the linear amplifier 342) to reduce noise during transitions between two levels and a digital output (e.g., provided by the MLS matrix 312) to efficiently provide the voltage source Vdd_trck at steady state. The MLS modulator 313 can include control circuitry (not illustrated) configured to control the switch 344 to connect the linear amplifier 342 to the output of the MLS modulator 313 during transitions and disconnect the linear amplifier 342 from the output of the MLS modulator 313 once a substantially fixed level is reached following a transition. Depending on the embodiment, the transition from the analog output to the digital output may be performed after a predetermined length of time and/or in response to variations in the analog output being less than a threshold amount.

In order to reduce noise during transitions, the MLS modulator 313 can be configured to provide an analog signal during each transition. In some implementations, the analog signal may resemble a pulse shaped filtered waveform. Once a fixed level is reached following a transition, the MLS matrix 312 is configured to close the switch or transistor within the MLS matrix 312 corresponding to the fixed voltage level indicated by the input to the MLS modulator 313. While the switch of the MLS matrix 312 is closed, a relatively higher (or optimal) efficiency is achieved until the next transition to a new fixed voltage level is indicated by the input to the MLS modulator 313. Accordingly, the MLS modulator 313 can smooth the edges using the analog output from the linear amplifier 342 and thereby reduce noise introduced during transitions, while also increasing efficiency by providing fixed voltage levels from the MLS matrix 312 after a fixed level is reached following a transition.

By controlling the output noise using the MLS modulator 313, the second filter 334 can be implement with a lower filtering order, or no filtering at all, compared to the second filter 314 of FIG. 8.

Figure 11:
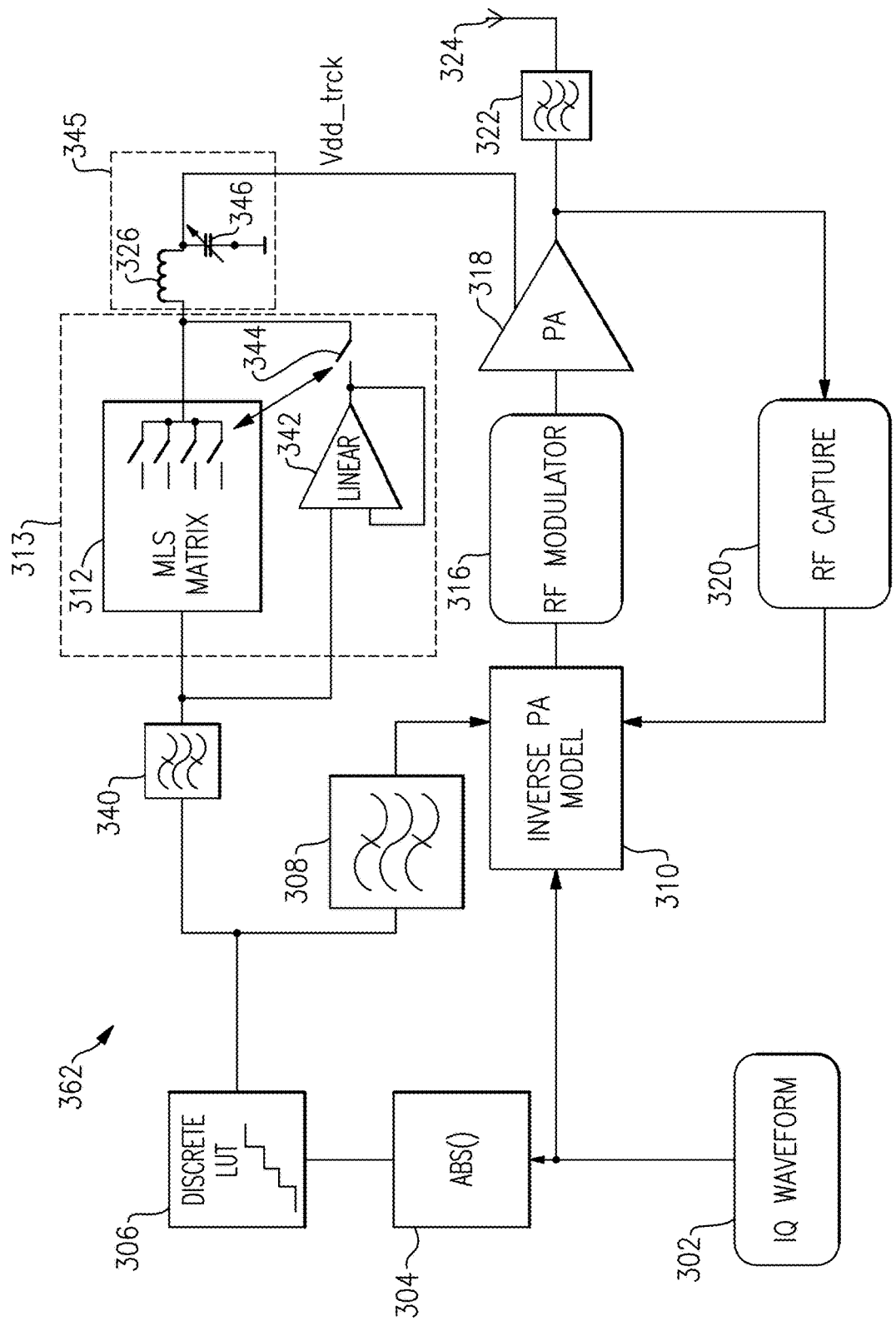
FIG. 11 is a schematic diagram of yet another multi-level envelope tracking power supply in accordance with aspects of this disclosure.

The multi-level envelope tracking power supply 360 or 362 of FIGS. 10 and 11 is configured to control the transitions in the voltage source Vdd_trek using an analog circuit (e.g., the linear amplifier 342), with variable BW pulse shaping. The external second filter 334 or 345 can be implemented with a comparatively low order and/or can be adjusted with only one switch. In-between transitions, the level of the voltage source Vdd_trck can be lock onto a voltage rail providing a discrete voltage, thereby providing a very efficient supply of the voltage source Vdd_trck. The duty cycle of the voltage source Vdd_trck can be generated such that more time is spent on the efficient supply for most RF signals and even longer when higher noise is tolerable. The shape of the transition in the voltage source Vdd_trck can be controlled, resulting in low noise when needed. In addition, any efficiency loss can be reduced when fast transitions are allowed. This allows enough flexibility by the use of programming the transitions in the voltage source Vdd_trck to move the bandwidth to high values when needed. These variable bandwidth pulse shaping techniques can also be extended to also be used with a sigma-delta MLS modulator, or a delta modulator encoding the transitions for selective noise filtering as described in connection with FIGS. 12 and 13.

In one example embodiment, using the variable bandwidth pulse shaping system provided by the multi-level envelope tracking power supply 360 or 362 of FIGS. 10 and 11 enables the use of both the lower bandwidth waveforms like LTES, 10 and 20 at low noise levels as well as wider 100 MHz or more NR signals.

FIG. 11 is a schematic diagram of yet another multi-level envelope tracking power supply 362 in accordance with aspects of this disclosure. The power supply 362 includes an IQ waveform source 302, an absolute value block 304, a discrete look-up-table 306, a first filter 308, an inverse power amplifier model 310, and MLS modulator 313, a second filter 345, an RF modulator 316, a power amplifier 318, an RF capture circuit 320, a duplexing and switching circuit 322, an antenna 324, and a pulse shaping filter 340. The MLS modulator 313 includes an MLS matrix 312, a linear amplifier 342, and a switch 344. Although not illustrated in detail, the MLS matrix 312 can be implemented in a manner similar to the envelope tracker 172 shown in FIG. 6, although other embodiments are also possible.

The embodiment illustrated in FIG. 11 may be similar to the embodiment of FIG. 10, with the exception of the second filter 334, includes an inductor 326 and a variable capacitor 346. By employing a variable capacitor 346, the second filter 345 can implement a matched filter by adjusting the variable capacitor 346 so that the second filter 345 becomes a desirable matched filter with a known output LC filter. Accordingly, the second filter 345 can enable sufficiently adjustment to cover multiple octaves of bandwidth adjustment.

In the implementation of FIG. 11, the second filter 334 can be implemented as a variable bandwidth hardware filter to improve the overall efficiency of the system. When the second filter 334 is a second order filter, it is possible to change the bandwidth of the second filter 334 by modifying only the variable capacitor 346. However, adjusting the capacitance of the variable capacitor 346 will change the dampening factor of the LC hardware filter. This change in dampening factor can be compensated at the source by matching the digital pulse shaping filter 340 with the second filter 345 to achieve the desired filtering. If the second filter 345 has an order that is higher than two, the accuracy involved in effectively compensating a high order filter with a variable load like a power amplifier may be too high to be practical.

Figure 12:
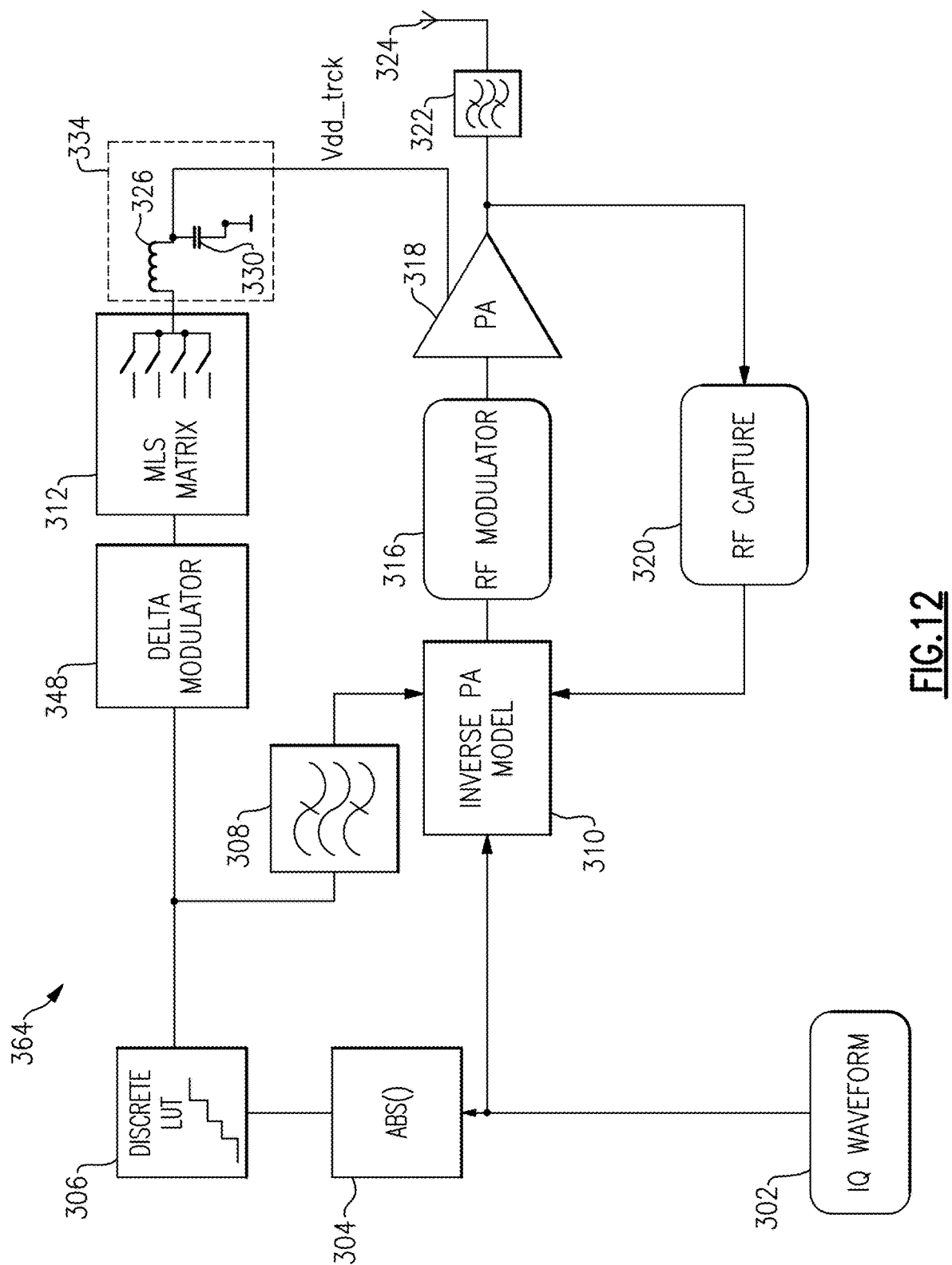
FIG. 12 is a schematic diagram of still yet another multi-level envelope tracking power supply in accordance with aspects of this disclosure.

Yet another aspect of this disclosure relates to a method for improving the linearity of the MLS modulator or MLS matric with a high speed delta coder. FIG. 12 is a schematic diagram of still yet another multi-level envelope tracking power supply 364 in accordance with aspects of this disclosure. The power supply 364 includes an IQ waveform source 302, an absolute value block 304, a discrete look-up-table 306, a first filter 308, an inverse power amplifier model 310, and MLS matrix 312, a second filter 334, an RF modulator 316, a power amplifier 318, an RF capture circuit 320, a duplexing and switching circuit 322, an antenna 324, and a delta modulator 348. Although not illustrated in detail, the MLS matrix 312 can be implemented in a manner similar to the envelope tracker 172 shown in FIG. 6, although other embodiments are also possible. The second filter 334 includes an inductor 326 and a capacitor 330.

The delta encoder 348 can be used as a pulse shaping filter and is configured to generate a plurality of pulses (e.g., a pulse train) that encode the signal received from the discrete look-up-table 306 in the form of the change (e.g., delta) in the signal. Thus, the delta encoder 348 is configured to smooth out the transitions in the voltage source Vdd_trek due to the placement of the delta encoder 348 in front of the MLS matrix 312. Thus, the delta encoder 348 can be used to achieve a desired pulse shape response in the voltage source Vdd_trck generated by the MLS matrix 312 and the second filter 334. By using the delta encoder 348 to achieve the desired pulse shape response, the second filter 334 can be implemented as a lower order filter compared to the second filter 314 of FIG. 8 and thus provides similar advantages to the implementation illustrated in FIG. 10.

Figure 13:
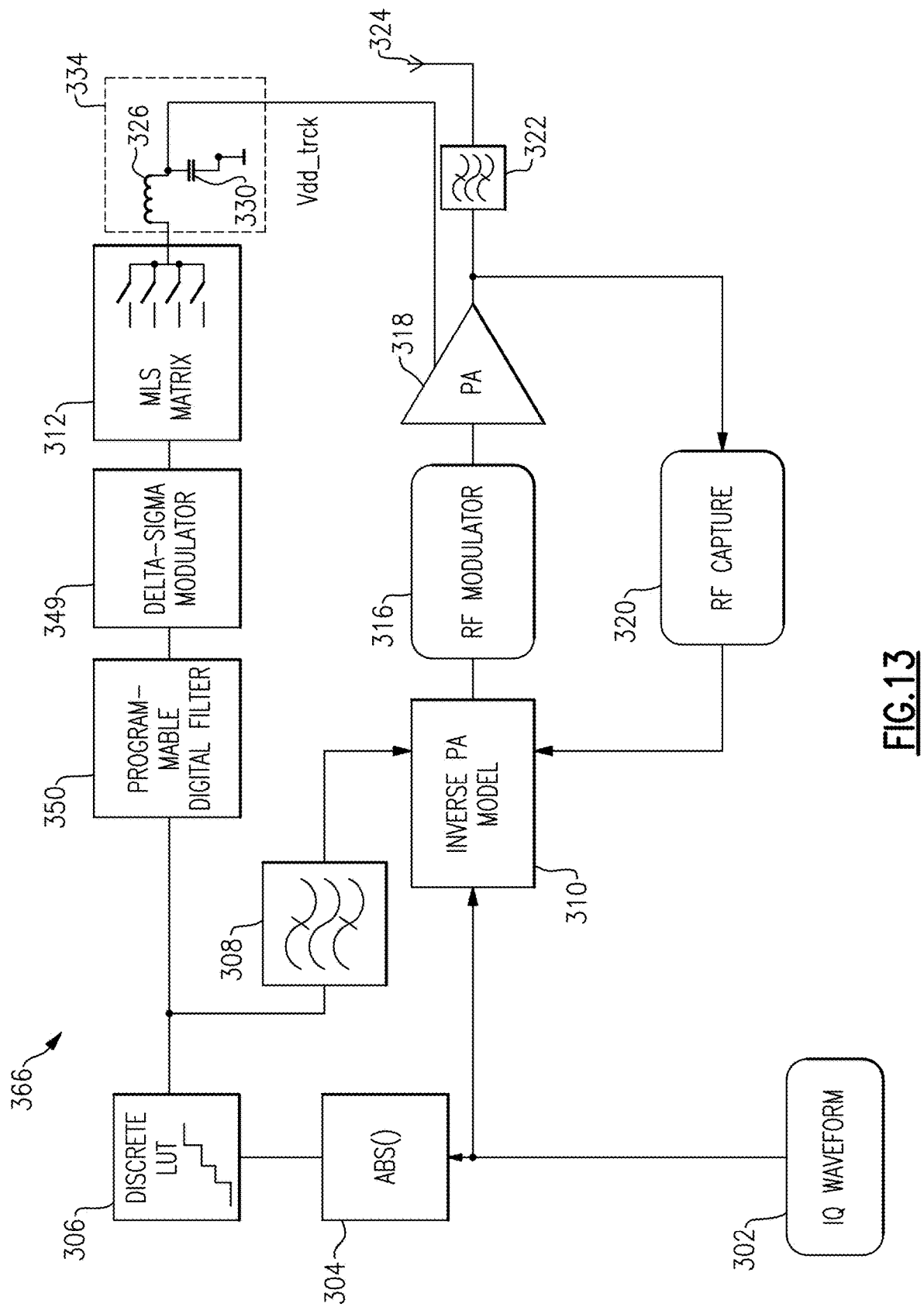
FIG. 13 is a schematic diagram of another multi-level envelope tracking power supply in accordance with aspects of this disclosure.

FIG. 13 is a schematic diagram of another multi-level envelope tracking power supply 366 in accordance with aspects of this disclosure. The FIG. 13 embodiment is similar to the embodiment illustrated in FIG. 12 in which the delta modulator 348 is replaced with a delta-sigma modulator 349 and a programmable digital filter 350. The delta-sigma modulator 349 and the programmable digital filter 350 together can be used as a pulse shaping filter in this implementation.

To create a transition in the voltage source Vdd_trck, the programmable digital filter 350 can generate a pulse train based on the transitions indicated by the discrete look-up-table 306 which can be averaged using a simple LC filter (e.g., the second filter 334). The delta-sigma modulator 348 can noise shape the pulse train such that the slow moving average of the shaped pulse train effectively follows the desired pulse shaped waveform and any high frequency image content of the pulse train can be filtered sufficiently by the second filter 334. For example, the delta-sigma modulator 348 can add one or more notches in locations that noise shape the pulse train to follow the desired pulse shaped waveform and enable filtering of any high frequency image content in the pulse train more effectively.

By encoding the edge transitions and replacing them by a suitable pulse train using the programmable digital filter 350 and the delta-sigma modulator 349, the multi-level envelope tracking power supply 366 is able to move and spread the energy of the harmonic spectra generated. When this is done, at least three improvements can be obtained. One improvement is that the order of the second filter 334 can be reduced (e.g., compared to the second filter 314 of FIG. 8). This improvement is particularly advantageous as it reduces the number of components needed to implement the multi-level envelope tracking power supply 366. A second improvement is that the need for a hardware variable bandwidth can be removed. When the bandwidth is reduced, more time is allowed for digital coding of the transitions, thus resulting in transitions that are digitally filtered at low frequencies, and LC filtered at high frequencies. A third improvement is that the efficiency of conversion into the second filter 334 is increased because the pulse energy is moved to a higher frequency where the input impedance of the second filter 334 is higher.

The programmable digital filter 350 and the delta-sigma modulator 349 (or the delta modulator 348 of FIG. 12) can implement one of many possible coding schemes. The particular coding scheme used may affect the length of the transitions. It may be desirable for each of the transitions to occur over a sufficient length of time to smooth the transition. It is also desirable to reduce or minimize the total number of fast transitions (e.g., transitions occurring over less than a predetermined length of time) such as not to increase the switching energy lost in gate charging of the transistors.

Figure 14:
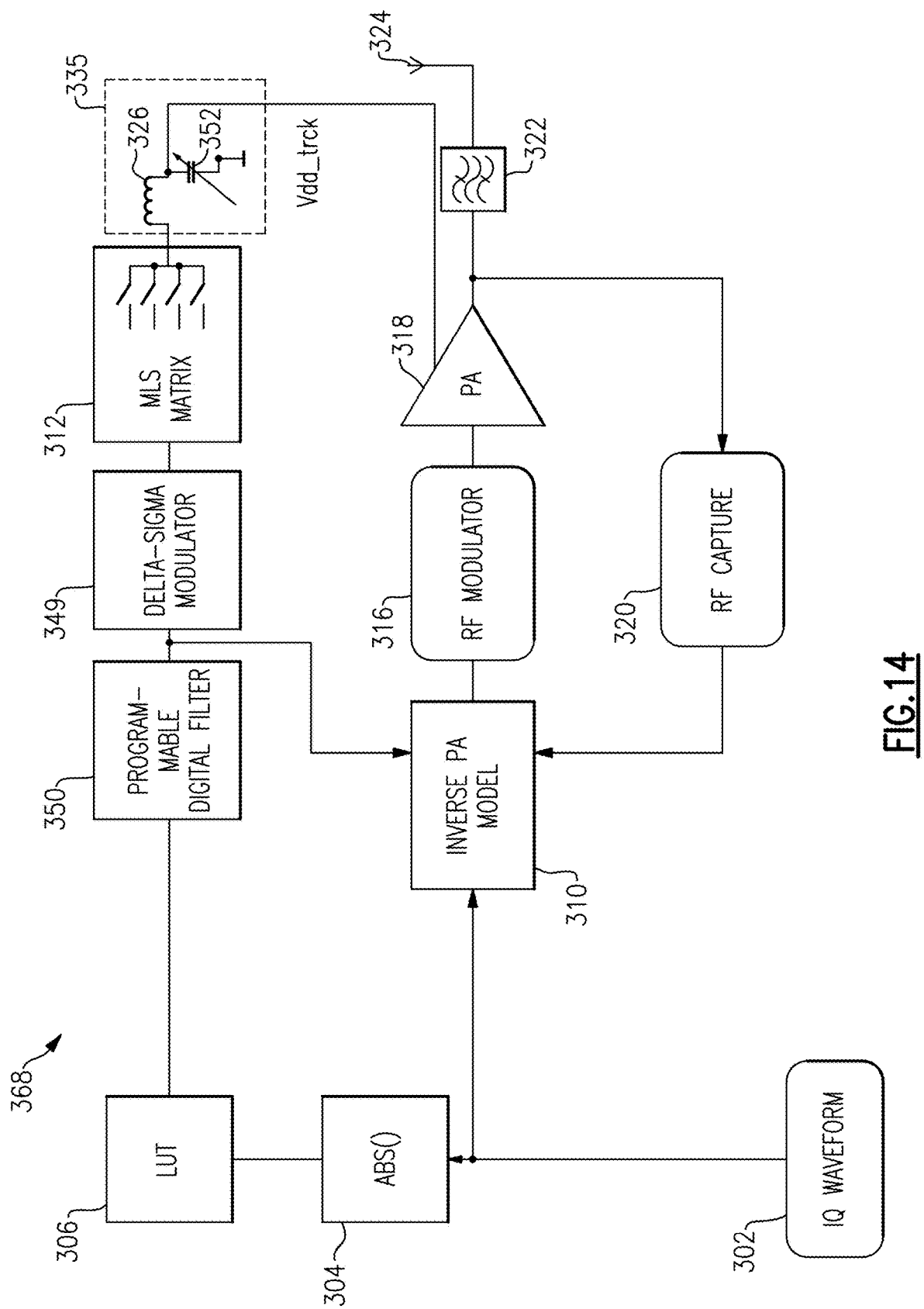
FIG. 14 is a schematic diagram of yet another multi-level envelope tracking power supply in accordance with aspects of this disclosure.

FIG. 14 is a schematic diagram of yet another multi-level envelope tracking power supply 368 in accordance with aspects of this disclosure. The FIG. 14 embodiment is similar to the embodiment illustrated in FIG. 13 in which the first filter 308 is removed and the output of the programmable digital filter 350 is provided to the inverse power amplifier model 310 and the capacitor 330 is replaced with a variable capacitor 352 (e.g., similar to the variable capacitor 346 of FIG. 11).

In the implementation of FIG. 14, the pulse shaping filter can be integrated as part of the power amplifier 318 chain by providing the output from the programmable digital filter 350 to the inverse power amplifier model 310. In addition, the multi-level envelope tracking power supply 368 can provide a variable bandwidth system through a combination of variable bandwidth filters including in the physical hardware LC filter (e.g., in the second filter 335). Advantageously, this can provide flexibility which may have a trade-off of noise for efficiency.

Figure 15:
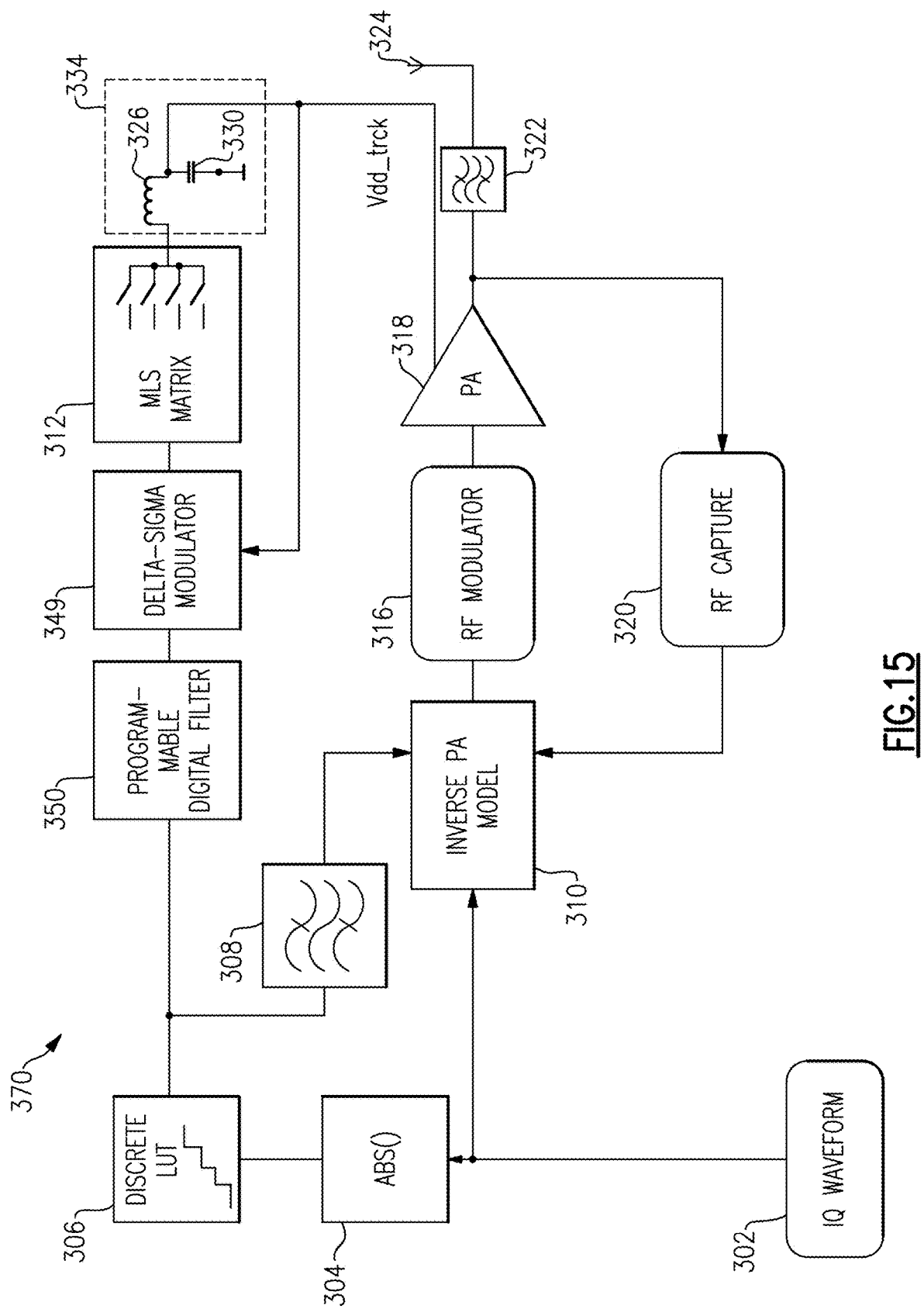
FIG. 15 is a schematic diagram of still yet another multi-level envelope tracking power supply in accordance with aspects of this disclosure.

FIG. 15 is a schematic diagram of still yet another multi-level envelope tracking power supply 370 in accordance with aspects of this disclosure. The FIG. 15 embodiment is similar to the embodiment illustrated in FIG. 14 with the addition of a feedback loop from the voltage source Vdd_trck to the delta-sigma modulator 349. This feedback provides an additional control input to the delta-sigma modulator 349 which can improve tracking of the envelope signal.

Figure 16:
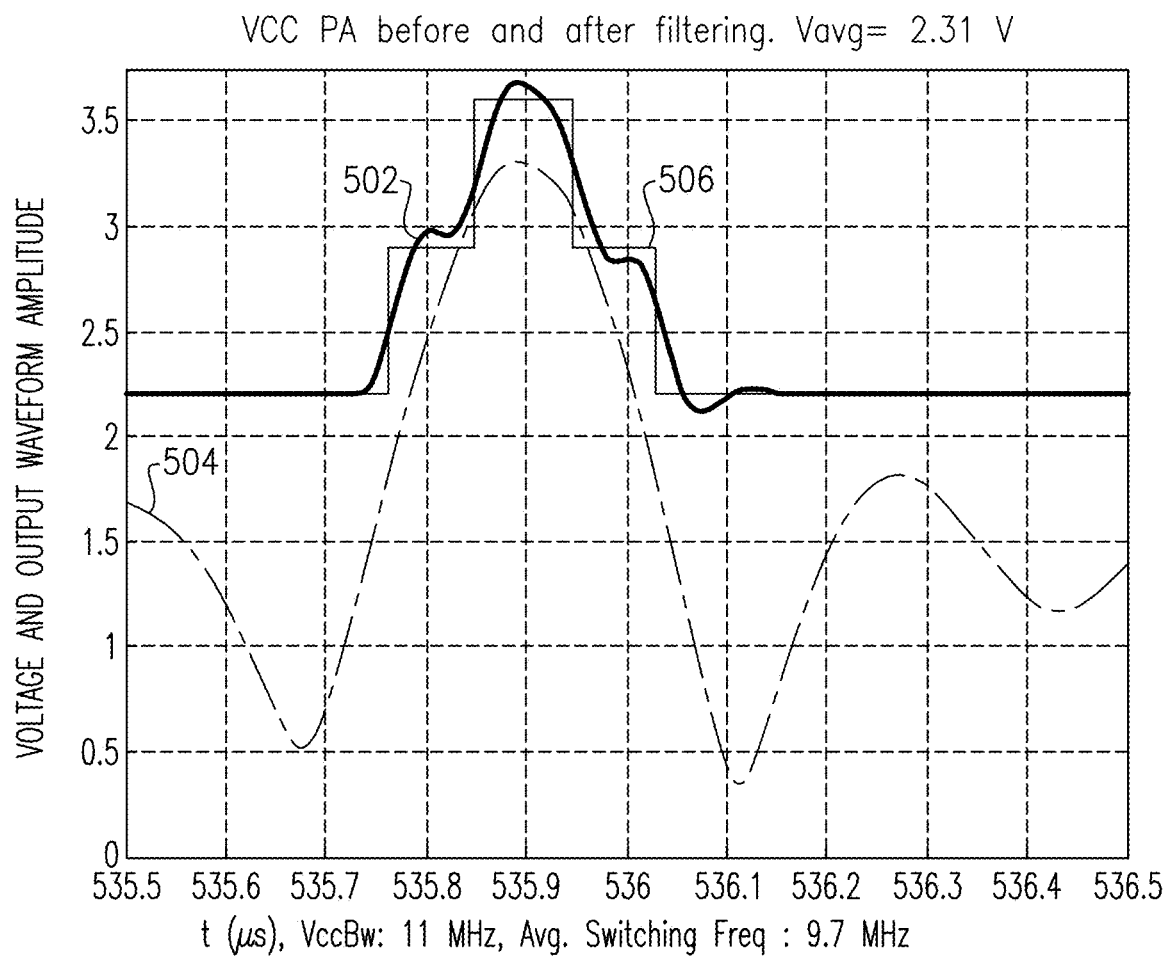
FIG. 16 illustrate an MLS filtered waveform that tracks an RF amplitude in accordance with aspects of this disclosure.

FIG. 16 illustrates an MLS filtered waveform 502 that tracks an RF amplitude 504 in accordance with aspects of this disclosure. The MLS filtered waveform 502 may correspond to the voltage source Vdd_trck provided to the power amplifier 318 as generated by the MLS modulator 313 (or MLS matrix 312) and filtered by a second filter (e.g., one of the second filters 334, 345, and 335 in FIGS. 10-14). Also shown is a square wave 506 as generated by the MLS modulator 313 prior to filtering by the second filter and overlaid on the MLS filtered waveform 502 for comparison. In comparison to the MLS filtered waveform 402 of FIG. 9, the MLS filtered waveform 502 of FIG. 16 has relatively smoother transitions with less noise.

CONCLUSION

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

While certain embodiments have been described, these embodiments have been presented by way of example only, and are not intended to limit the scope of the disclosure. Indeed, the novel resonators described herein may be embodied in a variety of other forms. Furthermore, various omissions, substitutions and changes in the form of the resonators described herein may be made without departing from the spirit of the disclosure. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A radio frequency module comprising:
   a power amplifier configured to receive a radio frequency input signal and a voltage source, the power amplifier further configured to amplify a radio frequency input signal using the voltage source to generate an output radio frequency signal; and
   a multi-level switch modulator configured to receive an envelope signal indicative of an envelope of the radio frequency input signal and generate the voltage source based on the envelope signal at one of a plurality of discrete voltage levels, the multi-level switch modulator including: an analog component configured to generate the voltage source during transitions between discrete voltage levels, a digital component configured to generate the voltage source following the transitions, and a first switch configured to electrically connect the analog component to an output of the multi-level switch modulator during the transitions and disconnect the analog component from the output following the transitions.

2. The radio frequency module of claim 1 wherein the analog component includes a linear power amplifier and the digital component includes a multi-level switch matrix.

3. The radio frequency module of claim 2 wherein the first switch is further configured to disconnect the linear power amplifier from the output in response to variations in an output from the linear power amplifier being less than a threshold amount.

4. The radio frequency module of claim 2 wherein the multi-level switch matrix includes a plurality of second switches configured to connect an output of the multi-level switch matrix to one of the plurality of discrete voltage levels.

5. The radio frequency module of claim 4 wherein the plurality of second switches are further configured to disconnect the output of the multi-level switch matrix from all of the plurality of discrete voltage levels during the transitions.

6. The radio frequency module of claim 2 wherein the linear power amplifier has an input electrically coupled to an input of the multi-level switch matrix.

7. The radio frequency module of claim 1 further comprising a filter electrically coupled between the multi-level switch modulator and the power amplifier, the filter configured is to filter frequencies above a predetermined threshold value.

8. The radio frequency module of claim 7 wherein the filter is configured as a second order filter and includes an inductor and a capacitor.

9. The radio frequency module of claim 8 wherein the capacitor includes a variable capacitor configured to adjust the filter to cover multiple octaves of bandwidth adjustment.

10. The radio frequency module of claim 1 further comprising a pulse shaping filter configured to control a bandwidth of the envelope signal and provide a pulse shaped envelope signal to the multi-level switch modulator.

11. The radio frequency module of claim 10 wherein the pulse shaping filter includes a delta encoder configured to generate a pulse train that encodes the envelope signal in the form of delta in the envelope signal.

12. The radio frequency module of claim 10 wherein the pulse shaping filter includes a programmable digital filter and a delta-sigma modulator, the programmable digital filter is configured to generate a pulse train based on the envelope signal, and the delta-sigma modulator is configured to noise shape the pulse train such that a moving average of the pulse train follows a desired pulse shaped waveform.

13. A mobile device comprising:
    an antenna configured to transmit and receive radio frequency signals; and
    a front end system coupled to the antenna and including: a power amplifier configured to receive a radio frequency input signal and a voltage source, the power amplifier further configured to amplify a radio frequency input signal using the voltage source to generate an output radio frequency signal, and the front end system further including a multi-level switch modulator configured to receive an envelope signal indicative of an envelope of the radio frequency input signal and generate the voltage source based on the envelope signal at one of a plurality of discrete voltage levels, the multi-level switch modulator including: an analog component configured to generate the voltage source during transitions between discrete voltage levels, a digital component configured to generate the voltage source following the transitions, and a first switch configured to electrically connect the analog component to an output of the multi-level switch modulator during the transitions and disconnect the analog component from the output following the transitions.

14. The mobile device of claim 13 wherein the analog component includes a linear power amplifier and the digital component includes a multi-level switch matrix.

15. The mobile device of claim 14 wherein the first switch is further configured to disconnect the linear power amplifier from the output in response to variations in an output from the linear power amplifier being less than a threshold amount.

16. The mobile device of claim 14 wherein the multi-level switch matrix includes a plurality of second switches configured to connect an output of the multi-level switch matrix to one of the plurality of discrete voltage levels.

17. The mobile device of claim 13 wherein the front end system further includes a filter electrically coupled between the multi-level switch modulator and the power amplifier, the filter configured is to filter frequencies above a predetermined threshold value.

18. The mobile device of claim 17 wherein the filter is configured as a second order filter and includes an inductor and a capacitor.

19. The mobile device of claim 18 wherein the capacitor includes a variable capacitor configured to adjust the filter to cover multiple octaves of bandwidth adjustment.

20. The mobile device of claim 13 wherein the front end system further includes a pulse shaping filter configured to control a bandwidth of the envelope signal and provide a pulse shaped envelope signal to the multi-level switch modulator.

21. The mobile device of claim 20 wherein the pulse shaping filter includes a delta encoder configured to generate a pulse train that encodes the envelope signal in the form of delta in the envelope signal.

22. An envelope tracking circuit comprising:
a multi-level switch modulator configured to receive an envelope signal indicative of an envelope of a radio frequency input signal and generate a voltage source for supplying a power amplifier, the voltage source generated based on the envelope signal at one of a plurality of discrete voltage levels, the multi-level switch modulator including: an analog component configured to generate the voltage source during transitions between discrete voltage levels, a digital component configured to generate the voltage source following the transitions, and a first switch configured to electrically connect the analog component to an output of the multi-level switch modulator during the transitions and disconnect the analog component from the output following the transitions.

* * * * *